(12) United States Patent
Miyata

(10) Patent No.: US 7,563,187 B2
(45) Date of Patent: Jul. 21, 2009

(54) BELT DRIVE SYSTEM

(75) Inventor: Hirofumi Miyata, Osaka (JP)

(73) Assignee: Bando Chemical Industries, Ltd., Hyogo (JP)

( * ) Notice: Subject to any disclaimer, the term of this patent is extended or adjusted under 35 U.S.C. 154(b) by 470 days.

(21) Appl. No.: 11/058,600

(22) Filed: Feb. 16, 2005

(65) Prior Publication Data

US 2005/0266947 A1 Dec. 1, 2005

(30) Foreign Application Priority Data

May 27, 2004 (JP) ............... 2004-157609

(51) Int. Cl.
- *F16H 7/20* (2006.01)
- *F16H 55/36* (2006.01)
- *F16H 7/14* (2006.01)
- *F16H 7/00* (2006.01)

(52) U.S. Cl. .............. 474/199; 474/118; 474/139

(58) Field of Classification Search ............ 474/148, 474/166, 273, 101, 117, 118, 139, 199; 198/806, 198/835
See application file for complete search history.

(56) References Cited

U.S. PATENT DOCUMENTS

| | | | | |
|---|---|---|---|---|
| 526,013 A | * | 9/1894 | Howard | 384/547 |
| 1,454,657 A | * | 5/1923 | Smith | 464/125 |
| 1,831,353 A | * | 11/1931 | Huxford et al. | 451/292 |
| 2,279,887 A | * | 4/1942 | Hathorn | 254/398 |
| 2,421,685 A | * | 6/1947 | Andre et al. | 384/498 |
| 3,251,235 A | * | 5/1966 | Cederberg et al. | 474/123 |
| 3,436,979 A | * | 4/1969 | Molitor | 474/138 |

(Continued)

FOREIGN PATENT DOCUMENTS

JP    59-45351    3/1984

(Continued)

OTHER PUBLICATIONS

Specification and Drawings and Official Filing Receipt for Related U.S. Appl. No. 10/944,756, filed Sep. 21, 2004.

*Primary Examiner*—Robert A Siconolfi
*Assistant Examiner*—Thomas W Irvin
(74) *Attorney, Agent, or Firm*—Studebaker & Brackett PC; Donald R. Studebaker

(57) ABSTRACT

In a drive belt system, an idler pulley 6 is formed by an auto belt alignment pulley. For example, a pulley body 60 is rotatably carried on a hollow cylindrical shaft member 62, a support rod 63 is inserted in the shaft member 62, and the pulley body 60 and the shaft member 62 are connected to each other via a pin 64 (pivot axis C2) for angular movement about the pin 64. The pin 64 is inclined orthogonally to the shaft member 62 and forward in the direction of rotation of the pulley body 60 with respect to the direction of a radial shaft load L. With this configuration, when a flat belt 8 deviates to one side, the pulley body 60 inclines to create a level difference in the direction of the radial shaft load L and angularly moves orthogonally to the flat belt 8, thereby correcting the deviation of the flat belt 8. To fulfill the auto belt alignment function, belt span lengths Si and So between the idler pulley 6 and both the adjacent pulleys 3 and 4 are each set larger than the width of the flat belt 8.

6 Claims, 18 Drawing Sheets

U.S. PATENT DOCUMENTS

| | | | | |
|---|---|---|---|---|
| 3,959,899 A | * | 6/1976 | Rangaswamy | 37/397 |
| 4,372,435 A | * | 2/1983 | Bradbury | 198/369.4 |
| 4,537,581 A | * | 8/1985 | Johansson et al. | 474/123 |
| 4,742,649 A | * | 5/1988 | Fuchs | 451/297 |
| 4,747,810 A | * | 5/1988 | Shepley et al. | 474/135 |
| 5,180,342 A | * | 1/1993 | Van Ee | 474/123 |
| 5,244,435 A | * | 9/1993 | Billett | 474/184 |
| 5,616,107 A | * | 4/1997 | Simonson | 482/97 |
| 6,000,531 A | * | 12/1999 | Martin | 198/835 |
| 6,125,712 A | * | 10/2000 | Kaburagi et al. | 74/421 R |
| 6,811,506 B2 | * | 11/2004 | Prior et al. | 474/199 |

FOREIGN PATENT DOCUMENTS

| | | |
|---|---|---|
| JP | 63-6520 | 11/1984 |
| JP | 6-307521 | 11/1994 |

* cited by examiner

BELT DRIVE SYSTEM

CROSS-REFERENCE TO RELATED APPLICATIONS

This application claims priority under 35 USC 119 to Japanese Patent Application No. 2004-157609 filed on May 27, 2004, the entire disclosure of which, including specification, drawings and claims, is incorporated herein by reference in its entirety.

BACKGROUND OF THE INVENTION (a) Field of the Invention

This invention relates to belt drive systems for transmitting power with a drive belt.

(b) Description of Related Art

In drive systems using a flat belt, the flat belt when running often causes wobbling and sidetracking towards one side of the pulley. This is because a flat belt is susceptible, as compared with the other kinds of drive belts, to position changes of drive system components, such as deviation of a pulley shaft from its normal position, deflection thereof due to change in radial shaft load, and pulley wobbling. If such a belt wobbling or sidetracking occurs, then the flat belt may come into contact with a flange of the flat pulley, resulting in a fuzzed flat belt side face or a frayed cord.

A known approach to this problem is to crown the outer periphery of a flat pulley (i.e., to form it into a convex surface). There is also a proposed technique to form the crown at the outer periphery of a pulley into the shape of a sphere around the rotation center of the pulley (see, for example, Japanese Unexamined Utility-Model Publication No. 59-45351). This proposed technique is intended, when a tension difference arises between the right and left portions of the flat belt to cause an inclination of the pulley shaft and its attendant deviation of the flat belt to one side of the pulley, to take advantage of rotation moment acting on the pulley by tension of the flat belt to eliminate the inclination (angular deviation) of the pulley shaft and the deviation of the flat belt.

There is also known a flat pulley the outer periphery of which has a multiplicity of grooves formed at regular intervals along its circumference (see, for example, Japanese Unexamined Patent Publication No. 6-307521). Each groove extends to form a V-shape symmetrically from the middle of the pulley width toward both sides. These grooves create between the flat belt and the pulley a frictional force which allows the flat belt to approach the middle of the pulley width, thereby preventing wobbling and sidetracking of the belt.

There is still also known a technique to place guide rollers to both sides of a flat belt and thereby limit the running position of the flat belt (see, for example, Japanese Examined Utility-Model Publication No. 63-6520).

SUMMARY OF THE INVENTION

The first-mentioned approach of crowning the pulley groove surface, however, has the following inconveniences. When the curvature of the crown is set at a small value taking count of running stability of the flat belt (prevention of wobbling and sidetracking), stress is focused on the middle of the belt width. This prevents effective utilization of the entire belt width for power transmission and leads to early cord fatigue and degraded power transmission performance. These inconveniences also arise when the crown is formed in the shape of a sphere.

The above-described grooving of the flat pulley surface raises the production cost of the flat pulley. In addition, it is difficult to certainly prevent wobbling and sidetracking of the flat belt simply by the grooving.

When the approach is employed of limiting the running position of the flat belt by placing guide rollers or the like to both sides thereof, both sides of the flat belt always contact such a limiting member. As a result, the belt side face is likely to fuzz and the cord is likely to fray. This creates the need for applying to the flat belt a special process for preventing such adverse effects, which is a disadvantage to reduction of production cost of the flat belt.

For the above-described reasons, though flat belt drive systems have lower loss due to belt flexing and very higher power transmission efficiency as compared with systems using other types of belts, such as V-belts, they were not exploited enough.

To cope with this, the inventors have developed, by taking advantage of the phenomenon that the position of a radial shaft load on a pulley or a pulley shaft shifts by tension of a drive belt when the drive belt deviates to one side of the pulley, systems in which the shifted radial shaft load inclines the pulley obliquely to the belt to return the belt from the deviated position to the normal position and have filed patent applications on them (see, for example, Japanese Patent Application No. 2004-058632).

The features of the belt drive system according to the previously filed application lie in the structure of a pulley for automatically aligning the running position of the drive belt as described above (hereinafter, also referred to as an "auto belt alignment pulley". More specifically, the pulley comprises a hollow cylindrical pulley body around which a drive belt is to be wrapped, a hollow cylindrical shaft member that rotatably carries the pulley body, and a support rod that is inserted in the shaft member, wherein the support rod and the shaft member are engaged with each other through a pin or the like so that the pulley body and the shaft member can be angularly moved about the pin or the like.

Furthermore, the axis of the pin or the like, i.e., the axis of angular movement of the pulley body and the shaft member (pivot axis), is disposed to intersect the rotational axis of the pulley body and incline forward in the direction of rotation of the pulley body with respect to the direction of the radial shaft load on the shaft member. With this structure, when the drive belt deviates to one side on the pulley body so that the position of the radial shaft load on the shaft member shifts in the width direction of the pulley body, the shifted radial shaft load causes the pulley body to angularly move about the pivot axis and the pulley body thereby contacts obliquely with the drive belt. As a result, the drive belt is twisted to change its running position toward the middle of the pulley width.

In twisting the drive belt by angular movement of the pulley body to change its running position as described above, if the drive belt has a large resistance against its own twisting, then the angular movement of the pulley body is restrained so that the deviation of the drive belt may not sufficiently be corrected. For example, it can be considered that when a wide drive belt is twisted, it naturally has a larger twisting resistance than narrower drive belts, that when the belt span between the auto belt alignment pulley for twisting the drive belt and an adjacent pulley is long, the belt is likely to allow twisting, and that when on the other hand the belt span is short, the drive belt has a large twisting resistance.

With the foregoing in mind, the present invention aims, when the auto belt alignment pulley according to the previously filed application is used to prevent wobbling and sidetracking of a flat belt or other drive belts, at enabling certain prevention of wobbling and sidetracking of the drive belt by bringing out well the function of the auto belt alignment pulley against twisting resistance of the belt.

After diligent experiment and research taking into consideration the relationship between belt width or belt span length and belt twisting resistance, the inventors have found that in order to allow the auto belt alignment pulley to effectively operate in a belt drive system, the belt span between the pulley and adjacent pulleys needs to be longer than a given length determined according the width of a drive belt being used.

More specifically, a belt drive system of the present invention is configured so that a drive belt is wrapped around a plurality of pulleys, wherein at least one of the plurality of pulleys is an auto belt alignment pulley comprising: a hollow cylindrical pulley body around which the drive belt is wrapped; and a support mechanism that supports the pulley body to allow the pulley body to rotate about its rotational axis and angularly move about a pivot axis inclined at a predetermined angle forward in the direction of rotation of the pulley body with respect to the direction of a radial shaft load when viewed along the rotational axis, and the length of a belt span between the auto belt alignment pulley and each of adjacent pulley is set larger than a given value based on the width of the drive belt (i.e., determined according to the belt width).

In the belt drive system having the above configuration, the fundamental behavior of the auto belt alignment pulley is as follows: When the drive belt deviates to one side of the pulley body of the auto belt alignment pulley so that a radial shaft load acts on the pulley body at a position shifted from the pivot axis in the width direction of the pulley body, the shifted radial shaft load produces a rotation moment about the pivot axis to angularly move the pulley body. Thus, the pulley body inclines so that the side thereof to which the belt has deviated moves toward the direction of the radial shaft load, i.e., so that when the working surface level of the pulley body is viewed taking the direction of the radial shaft load as downward, the side thereof to which the belt has deviated is lower and the opposite side is higher. In other words, the outer periphery of the pulley body is inclined as in the case that it is crowned. Therefore, the belt receives a return force opposite to the direction of its deviation.

Furthermore, since the pivot axis serving as the center of angular movement is inclined forward in the direction of rotation of the pulley body with respect to the direction of the radial shaft load (i.e., the angle of inclination of the pivot axis is within the range from 0 to 90 degrees both exclusive), the angular movement of the pulley body includes not only a component in the direction of the radial shaft load but also a component in the forward/backward direction of the belt orthogonal to the direction of the radial shaft load (i.e., the direction in which the belt travels in contact with the pulley body). Accordingly, not only the pulley body is inclined in the direction of the radial shaft load as described above, but also its side to which the belt has deviated moves forward in the direction of belt travel to assume a position obliquely contacting the belt. This also corrects the deviation of the belt.

To sum up, since the pulley body is supported to the support mechanism for angular movement about the pivot axis, when the angle of inclination of the pivot axis is within the range from 0 to 90 degrees both exclusive, the drive belt deviated in the width direction of the pulley body receives a return force due to such an inclination of the pulley body as to create a level difference in the direction of the radial shaft load and is twisted in the direction of correcting the deviation by the angular movement of the pulley body to change its running position. In this manner, the belt travels while both these actions are canceled with the deviation of the belt caused by the characteristics of the entire belt drive system. As a result, the drive belt can be prevented from wobbling and sidetracking.

Comparing the action of a return force due to an inclination of the pulley body of the auto belt alignment pulley toward the direction of the radial shaft load with the action of the pulley body twisting the belt due to the belt assuming an oblique position to the pulley body, the latter has a greater anti-sidetracking effect. Therefore, in order to effectively use the action of the pulley body twisting the belt, the angle of inclination of the pivot axis in the auto belt alignment pulley is set preferably within the range from 0 degrees exclusive to 45 degrees inclusive, more preferably within the range from 0 degrees exclusive to 30 degrees inclusive.

However, as the twisting of the drive belt becomes relatively greater, the resistance of the belt against its own twisting is more likely to be an obstacle. This resistance may restrain the angular movement of the pulley body. Such twisting resistance of the belt is likely to be an obstacle, especially when the angle of wrap (angle of contact) of the belt on the pulley is larger than a certain angle (about 30 degrees). In such cases, it can be considered that with the same material or like used, the belt has a larger twisting resistance as the width is larger or the span between the auto belt alignment pulley and an adjacent pulley is shorter.

To cope with this, in the belt drive system having the above configuration, the length of a belt span between the auto belt alignment pulley and each of adjacent pulleys is set larger than a given value determined based on the width of the drive belt. Thus, even if a wider drive belt is used so that the twisting resistance becomes larger, the belt span length is correspondingly increased so that the belt easily allows its twisting. Therefore, even when the angle of wrap of the belt on the auto belt alignment pulley is large to a certain extent, the twisting resistance of the belt does not become so large and allows a sufficient angular movement of the pulley body. As a result, the auto belt alignment pulley provides the above-mentioned anti-sidetracking effect.

To be more specific, both the lengths of a belt span from which the drive belt enters the auto belt alignment pulley and a belt span toward which the drive belt exits are preferably set larger than the width of the drive belt. Thus, the above-mentioned anti-sidetracking effect on the belt can certainly be obtained even if the angle of wrap of the belt on the pulley is large to a certain extent, though the relationship between the belt width and pulley width, and the tension, the thickness, material and shape of the belt, for example, need to be set appropriately because they correlatively affect the anti-sidetracking effect.

Preferably, the length of the belt span on an entrance side of the auto belt alignment pulley from which the drive belt enters the auto belt alignment pulley is set smaller than that of the belt span on an exit side of the auto belt alignment pulley toward which the drive belt exits. This takes into consideration that when the drive belt is twisted by the angular movement of the auto belt alignment pulley, the surface pressure distribution on the contact surface between the drive belt and the pulley changes to change the magnitude of the radial shaft load on the pulley and in turn the rotation moment of the pulley about the pivot axis.

Specifically, when the pulley body of the auto belt alignment pulley angularly moves about the pivot axis so that it assumes an oblique position to the drive belt and its side to which the belt has deviated moves forward in the belt travel direction, the moved side of the pulley body gets away from the belt span on the entrance side of the pulley to reduce the surface pressures between the pulley and belt. On the other hand, the side of the pulley body from which the belt exits gets close to the belt to increase the surface pressures. Therefore, the rotation moment produced on the pulley body resulting from the radial shaft load is decreased.

In this respect, for example, in a belt-pulley system layout in which the auto belt alignment pulley is different in terms of the contact surface with the drive belt from adjacent pulleys closest to its entrance and exit for the belt, the drive belt is pressed more strongly against the auto belt alignment pulley by the adjacent pulleys than other layouts. In this case, if the length of the belt span on the entrance side of the auto belt alignment pulley is relatively short as described above, this decreases the distance between the auto belt alignment pulley and the pulley adjacent to the entrance side of the auto belt alignment pulley, thereby restraining reduction in surface pressures on the entrance side thereof. On the other hand, if the length of the belt span on the exit side of the auto belt alignment pulley is relatively long, this decreases rise in surface pressures on the exit side thereof. Thus, the decrease in rotation moment due to angular movement of the pulley body can be reduced to angularly move the pulley body more effectively.

In order to restrain reduction in surface pressures between the drive belt and auto belt alignment pulley by pressing the drive belt against the auto belt alignment pulley in the belt span located on the entrance side of the pulley, the length of the belt span on the entrance side of the auto belt alignment pulley is preferably set at less than about three times as large as the width of the drive belt.

As a specific structure of the above auto belt alignment pulley, the support mechanism for the auto belt alignment pulley may comprises: a hollow cylindrical shaft member that rotatably carries the pulley body; a support rod that is inserted in the hollow of the shaft member; and an engagement member that is located between and engages with both the support rod and the shaft member to constitute the pivot axis. The engagement member is preferably a pin for connecting the shaft member and the support rod for angular movement or a hemispherical projection slidably fitted into a hemispherical recess formed in one of the shaft member and the support rod, but may be an elastic body for connecting the shaft member and the support rod for angular movement.

The above auto belt alignment pulley may be used as any pulley other than a drive pulley in a belt drive system. Drive belts used in the belt drive system of the present invention include all types of belts such as flat belts and synchronous belts (timing belts). For flat belts, either of their inner face and outer face may be contacted with a pulley body. For synchronous belts, their back face opposite to the working face is preferably contacted with a pulley body.

As can be seen from the above, in a belt drive system of the present invention provided with an auto belt alignment pulley that angularly moves by shift in radial shaft load due to a deviation of a drive belt to thereby align the running position of the drive belt, the auto belt alignment pulley can be angularly moved well against twisting resistance of the belt at least by making the belt span lengths between the auto belt alignment pulley and adjacent pulleys larger than the width of the drive belt, resulting in secure prevention of wobbling and sidetracking of the drive belt.

Furthermore, if the length of a belt span on an entrance side of the auto belt alignment pulley from which the drive belt enters the auto belt alignment pulley is set smaller than that of a belt span on an exit side of the auto belt alignment pulley toward which the drive belt exits, changes in contact surface pressures caused when the drive belt is twisted by an angular movement of the auto belt alignment pulley can be restrained to reduce associated decrease in rotation moment. This further enhances the above effect.

DESCRIPTION OF THE PREFERRED EMBODIMENTS

Hereinafter, embodiments of the present invention will be described in detail with reference to the drawings.

Figure 1:
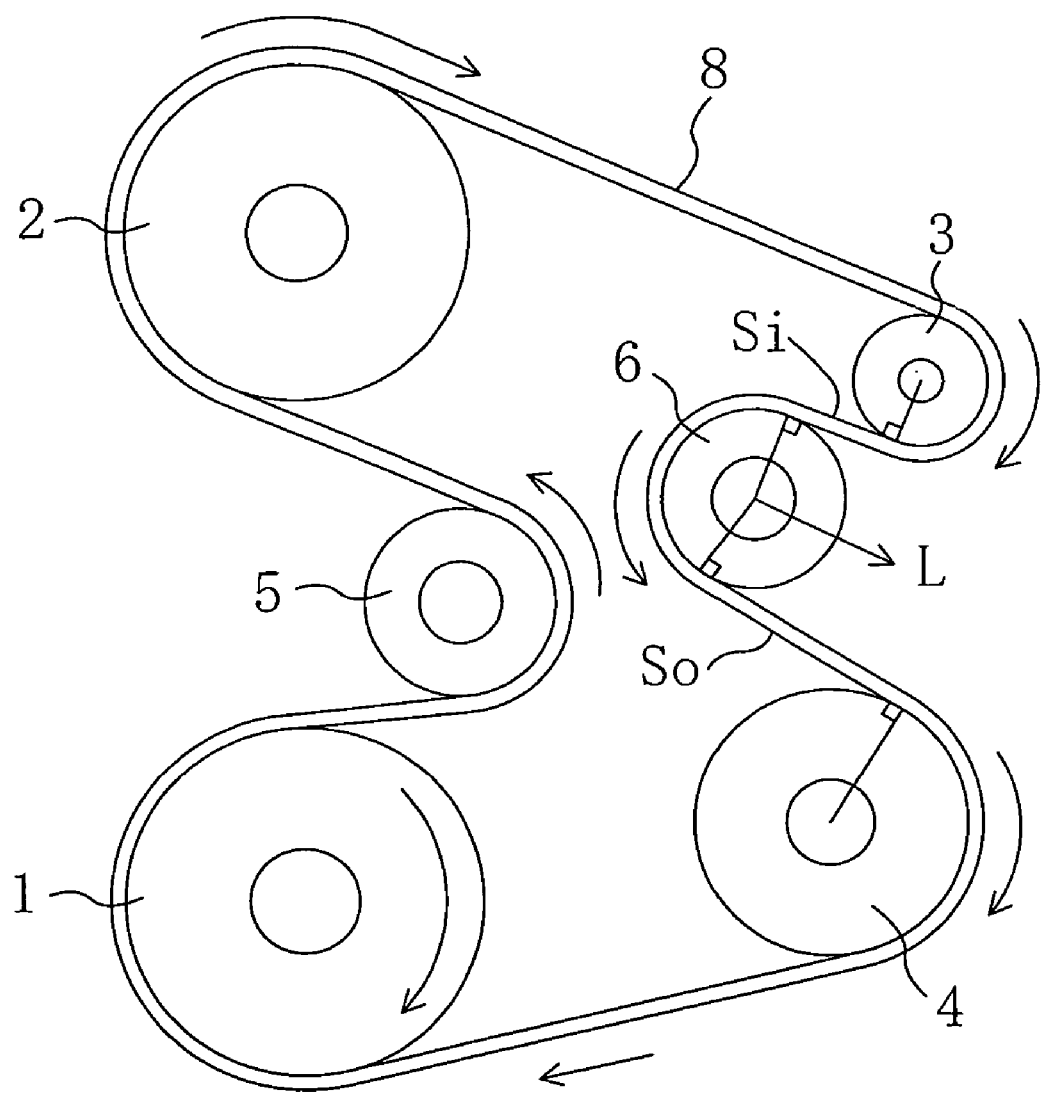
FIG. 1 shows a schematic configuration of an exemplary belt drive system according to the present invention.

FIG. 1 schematically shows the layout of a belt and pulleys when a belt drive system according to the present invention is applied to an engine accessory drive system A. In this figure, reference numeral 1 denotes a crank pulley serving as a drive pulley mounted on a crank shaft (not shown) of an engine E for unitary rotation therewith. Reference numerals 2 to 6 denote driven pulleys, including a PS pump pulley 2 mounted on a rotation shaft of a power steering pump (not shown) serving as an engine accessory for unitary rotation with the rotation shaft, an alternator pulley 3 mounted on a rotation shaft of an alternator (not shown) serving as an engine accessory for unitary rotation with the rotation shaft, a compressor pulley 4 mounted on a rotation shaft of an air conditioning compressor (not shown) serving as an engine accessory for unitary rotation with the rotation shaft, a tension pulley 5 for an auto tensioner (not shown) for adjusting the tension of a belt 13, and an idler pulley 6.

The crank pulley 1, the PS pump pulley 2, the alternator pulley 3, the compressor pulley 4, the tension pulley 5 and the idler pulley 6 are all formed of a flat pulley. A drive belt 8 is wrapped around these pulleys in a so-called serpentine layout. Specifically, in this embodiment, the belt 8 is wrapped around the pulleys 1 to 4 for driving the engine accessories in a normal winding condition where the belt inner face contacts them and around the tension pulley 5 and the idler pulley 6 in an inverse winding condition where the belt outer face contacts them.

When the crank shaft (and in turn the crank pulley 1) is driven by the rotation of the engine E to start its rotation, the drive belt 8 travels sequentially from crank pulley 1 through tension pulley 5, PS pump pulley 2, alternator pulley 3, idler pulley 6 and compressor pulley 4 and then back to crank pulley 1, clockwise when viewed in FIG. 1, to drive the engine accessories.

It should be understood that the shown configuration of the belt drive system is merely exemplary in nature and is not intended in any sense to limit the scope of the invention. Therefore, the present invention is not to be regarded to be limited to engine accessory drive systems as described above, but is to be regarded to be applicable for various industrial machines and other equipment. In such cases, various belt pulley arrangements without departing from the scope of the invention are applicable as needed.

Idler Pulley Structure

Figure 2:
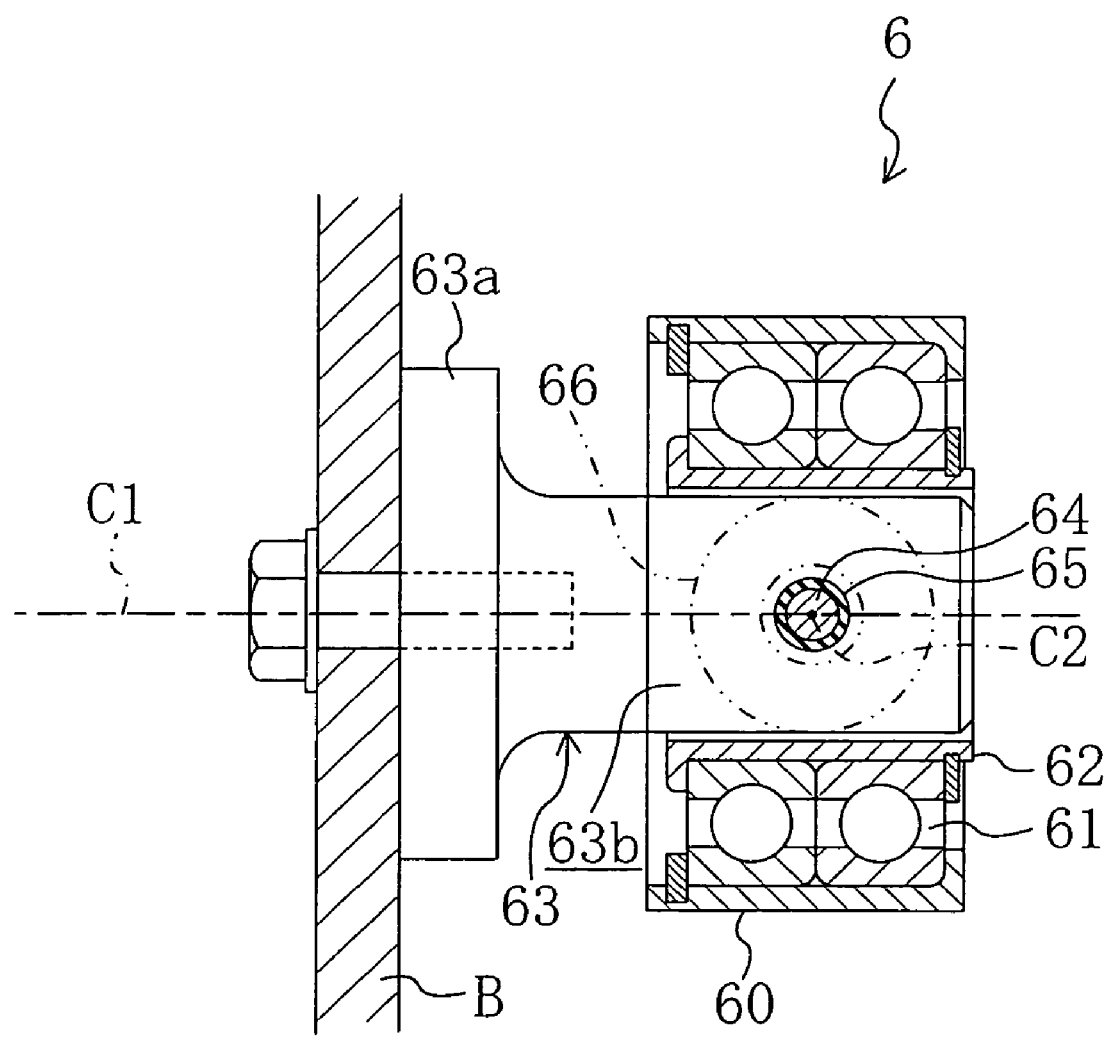
FIG. 2 is a partial cross section of an exemplary auto belt alignment pulley according to the present invention when viewed in the direction of a radial shaft load.
Figure 3A:
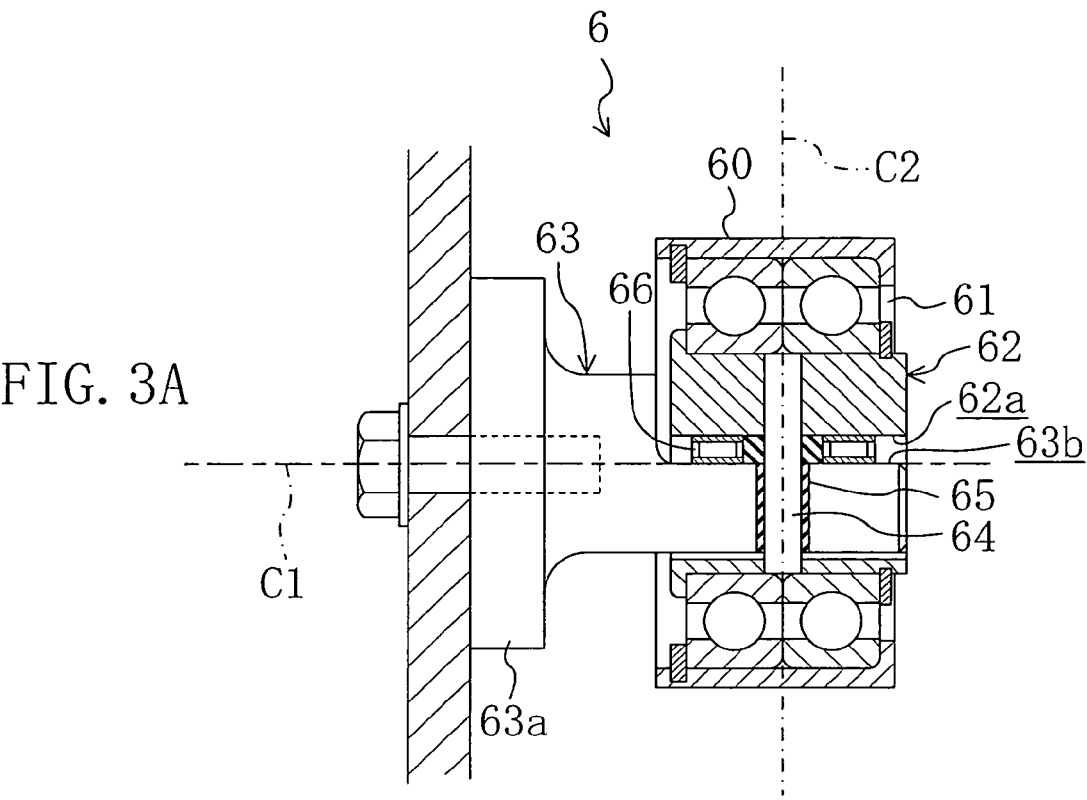
FIG. 3A is a partial cross section of the auto belt alignment pulley when viewed in the direction orthogonal to the pivot axis and FIG. 3B is a transverse cross section of a shaft member.

In the above engine accessory drive system A, the idler pulley 6 is an auto belt alignment pulley that, upon deviation of the drive belt 8 to one side, angularly moves to correct the deviation and thereby automatically align the running position of the drive belt 8. As shown in FIGS. 2 and 3 illustrating an example of a specific idler pulley structure, the idler pulley 6 of this embodiment comprises a hollow cylindrical pulley body 60 around which the drive belt 8 is to be wrapped, a hollow cylindrical shaft member 62 that carries the pulley body 60 for rotation about the rotational axis C1 through a bearing 61, and a support mechanism that supports the pulley body 60 and the shaft member 62 for angular movement about a pivot axis C2 orthogonal to the rotational axis C1. The support mechanism is composed of a support rod 63 and a pin 64 providing the pivot axis C2.

Figure 3B:
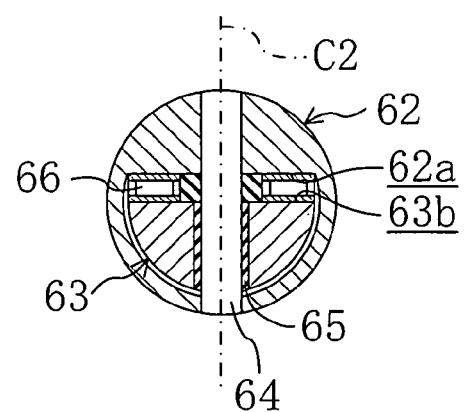

The support rod 63 is formed at its root end with a flange 63a, and is secured to a side wall of the cylinder block or cylinder head of the engine E through a bracket B to which the flange 63a is fastened. The distal end portion of the support rod 63 is inserted into the hollow of the shaft member 62 and for this reason is formed into a D-shape in cross section obtained by axially halving the rod of circular cross section as shown in FIG. 3B. A resulting flat surface 63b (hereinafter referred to as a D-cut surface), serving as part of the outer periphery of the distal end portion, is disposed substantially orthogonally to the pivot axis C2.

Furthermore, the distal end portion of the support rod 63 is formed substantially in the middle thereof with a through hole of circular cross section extending radially along the pivot axis C2. The through hole is open at one end (an upper end in FIG. 3) to the D-cut surface 63b and at the other end to an arcuate surface serving as another part of the outer periphery of the distal end portion of the support rod 63.

The hollow of the shaft member 62 is formed in a D-shaped cross section corresponding to the cross section of the distal end portion of the support rod 63. Specifically, the inner surface of the shaft member 62 is formed with a flat facing surface 62a opposed in the direction of the pivot axis C2 to the D-cut surface 63b of the support rod 63 and orthogonal to the pivot axis C2. The inner surface of the shaft member 62 is also formed with an arcuate surface surrounding the arcuate outer surface of the support rod 63. These facing surface 62a and the arcuate surface of the shaft member 62 are formed with support holes of circular cross section, respectively, that are open at corresponding locations on the shaft member 62 to the through hole of the support rod 63 and extend along the pivot axis C2.

The pin 64 is inserted into the through hole of the support rod 63 and fitted at both ends into the support holes of the shaft member 62 (i.e., the pin 64 is thereby disposed approximately in the middle of the width of the pulley body 60 and orthogonally to both the D-cut surface 63b of the support rod 63 and the facing surface 62a of the shaft member 62). Furthermore, a hollow cylindrical, resin-made, sliding member 65 is disposed between the outer periphery of the pin 64 and the through hole inner periphery of the support rod 63. A needle bearing 66 of substantially disk shape (or otherwise a ball bearing or the like) is interposed between the D-cut surface 63b of the support rod 63 and the facing surface 62a of the shaft member 62.

With this pulley structure, the shaft member 62 and the pulley body 60 are supported to the support rod 63 for angular movement about the pin 64 (or pivot axis C2), and the needle bearing 66 can largely reduce the sliding frictional resistance between the shaft member 62 and the support rod 63 due to angular movement of the shaft member 62 and pulley body 60 while stably bearing the radial shaft load on the shaft member 62 due to the tension of the drive belt 8. Between the arcuate surface of the outer periphery of the support rod 63 continuing to the D-cut surface 63b thereof and the arcuate surface of the inner periphery of the shaft member 62 surrounding the support rod 63, a clearance is created for allowing the shaft member 62 to angularly move about the pin 64 together with the pulley body 60.

Figure 4:
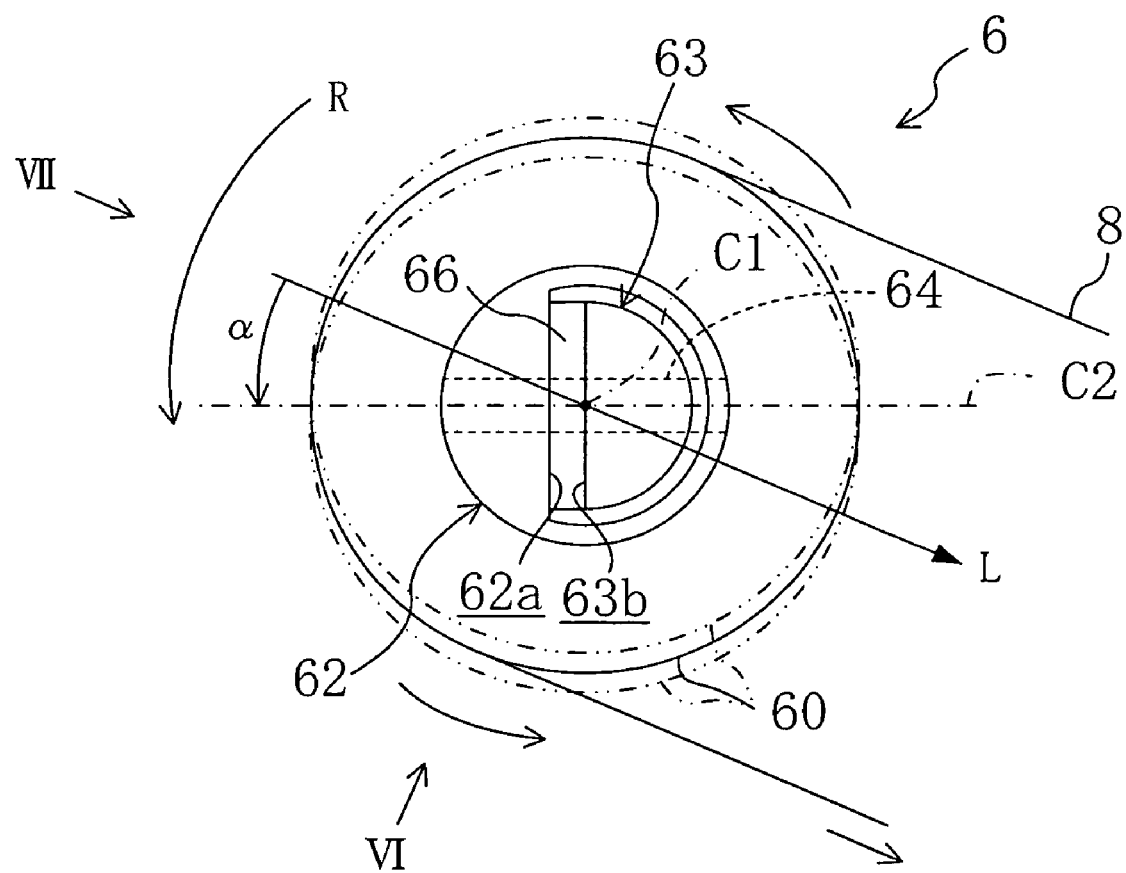
FIG. 4 is a partly cross-sectional side view showing a state of use of the pulley.

Furthermore, as schematically shown in FIG. 4, the idler pulley 6 is arranged in the engine accessory drive system A as shown in FIG. 1 to incline the pivot axis C2 at a certain angle α forward in the direction of rotation of the pulley body 60 with respect to the direction of the radial shaft load L caused by the tension of the belt 8, i.e., forward in the direction of belt travel as indicated by the arrow R in the figure. With this arrangement, when the running belt 8 wrapped around the pulley body 60 deviates to one side, this causes a shift in the center of the radial shaft load so that the pulley body 60 leans in the direction of the radial shaft load and concurrently assumes an oblique position to the belt 8. As a result, the pulley body 60 corrects the deviation of the belt 8.

Figure 5:
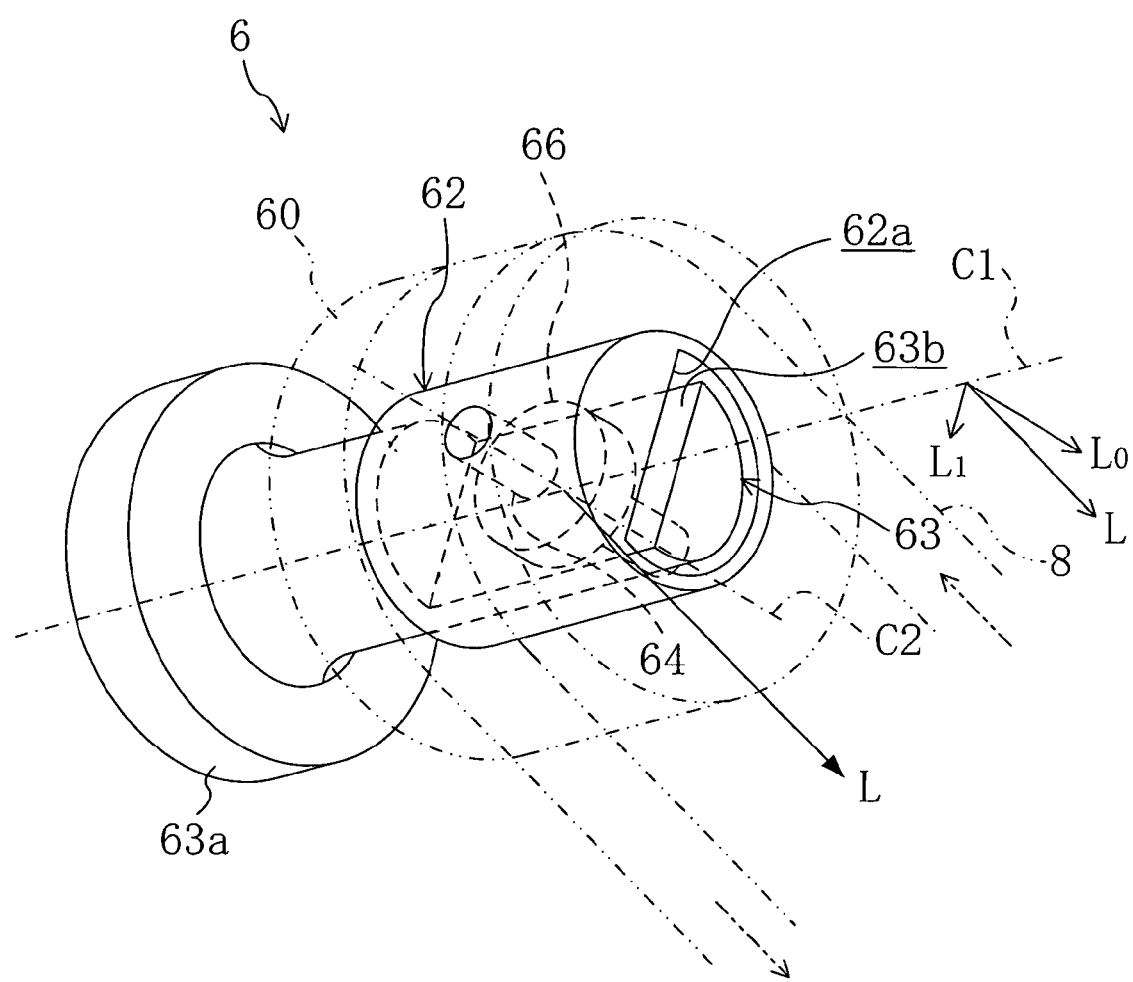
FIG. 5 is a perspective view for illustrating the occurrence of a rotation moment on the shaft member due to a radial shaft load in the above state of use.

To be more specific, as shown in FIG. 5, when the drive belt 8 is entrained about the pulley body 60 approximately in the middle of the width, the vector L of the radial shaft load (shown in the solid line) intersects the pivot axis C2 so that a component force L0 acts along the pivot axis C2 and another component force L1 acts orthogonally to the pivot axis C2. On the other hand, though not shown, when the drive belt 8 deviates from the middle of the pulley body 60 to one side thereof, the radial shaft load L shifts to the one side and acts from the shifted position. In this case, a component force L1 of the radial shaft load produces a rotation moment about the pivot axis C2 that acts on the shaft member 62. The shaft member 62 thereby angularly moves about the pin 64 (i.e., pivot axis C2) together with the pulley body 60.

In this relation, even with the shift in the radial shaft load L due to deviation of the drive belt 8 as described above, if the direction of the radial shaft load L were parallel with the pivot axis C2, then L=L0 and L1=0, which would generate no rotation moment about the pivot axis C2. However, if, like this embodiment, the direction of the radial shaft load L is inclined at an angle α to the direction of the pivot axis C2, the component force L1 of the radial shaft load L produces a rotation moment about the pivot axis C2, thereby angularly moving the shaft member 62 and the pulley body 60 about the pivot axis C2. The angle α corresponds to the angle of inclination of the pivot axis C2 with respect to the direction of the radial shaft load L.

Figure 6:
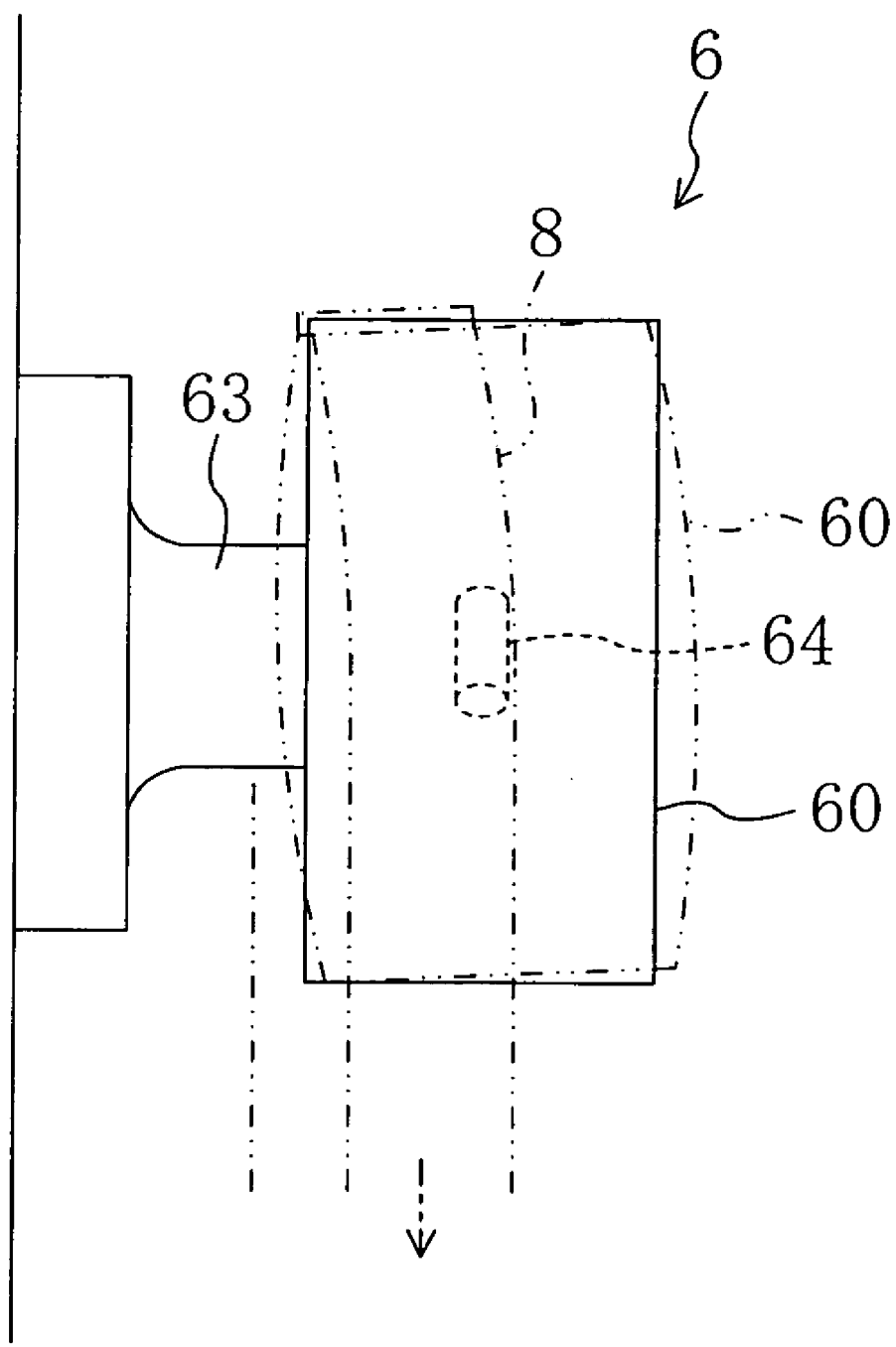
FIG. 6 schematically illustrates an angularly moved position of the pulley body when the belt has deviated in the above state of use, as viewed in the direction orthogonal to the radial shaft load L (in the direction of arrow VI in FIG. 4).
Figure 7:
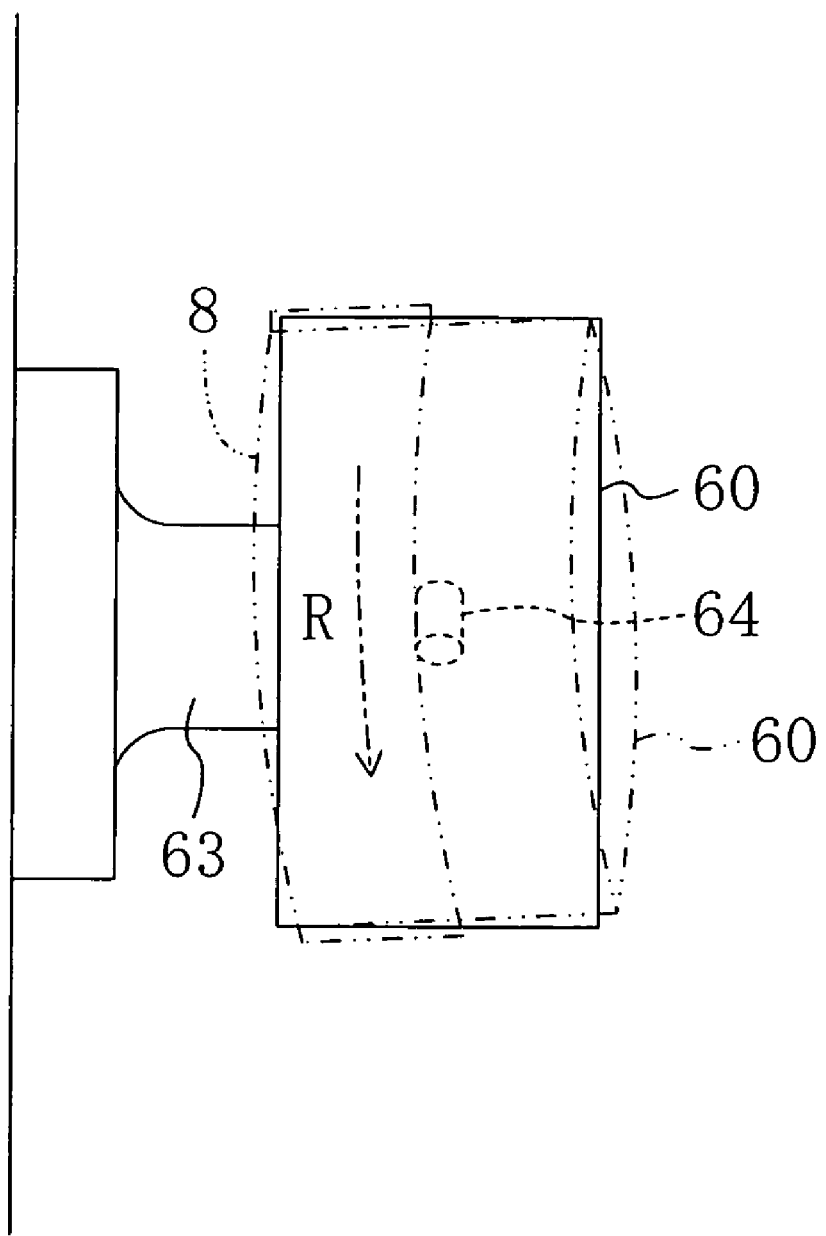
FIG. 7 schematically illustrates an angularly moved position of the pulley body when the belt has deviated in the above state of use, as viewed in the direction of the radial shaft load L (in the direction of arrow VII in FIG. 4).

As described above, in this embodiment, the pivot axis C2 is inclined forward in the direction of rotation of the pulley body 60 with respect to the direction of the radial shaft load L as shown in FIG. 4. Therefore, when the pulley body 60 and the shaft member 62 are moved angularly about the pin 64 (i.e., the pivot axis C2) by the component force L1 of the radial shaft load, the pulley body 60 inclines, as shown with exaggeration in FIG. 6 viewed in the direction orthogonal to the radial shaft load L (view taken along the arrow VI of FIG. 4), so that with respect to the direction of L (the downward direction of FIG. 6) the side of the pulley body 60 to which the drive belt 8 has deviated is lower than the other side. Concurrently, as shown with exaggeration in FIG. 7 viewed in the direction of the radial shaft load L (view taken along the arrow VII of FIG. 4), the pulley body 60 assumes an oblique position to the travel direction R of the drive belt 8 so that the side thereof to which the belt 8 has deviated is located more forward in the belt travel direction R than the other side. In FIGS. 4, 6 and 7, the drive belt 8 is shown in the imaginary lines (dash-double-dot lines) only in its position when the pulley body 60 has angularly moved.

When the pulley body 60 has thus angularly moved, the leaning of the pulley body 60 in the direction of the radial shaft load as shown in FIG. 6 allows the drive belt 8 to receive from the pulley body 60 a return force that acts in a direction to correct the deviation, and concurrently the oblique position of the pulley body 60 as shown in FIG. 7 allows the drive belt 8 to be twisted toward a direction to correct the deviation by the pulley body 60, whereby the drive belt 8 is changed in its travel direction. Thus, both these actions eliminate the deviation of the drive belt 8 to prevent sidetracking.

In this embodiment, as shown in FIG. 1, the drive belt 8 is wrapped relatively deeply around the idler pulley 6 (in the shown example, the angle of wrap is approximately 180 degrees). Thereby, the radial shaft load L is well imposed on the pulley body 60. The manner of wrapping of the drive belt, however, is not limited to the above. Nevertheless, in order to angularly move the pulley body 60 using the radial shaft load L as described above, the angle of wrap of the drive belt 8 is preferably approximately 10 degrees or more.

Idler Pulley Layout

When comparison is made between the action of the return force due to leaning of the pulley body 60 of the idler pulley 6 toward the direction of the radial shaft load and the action of twisting the belt 8 due to the oblique position of the pulley body 60 to the belt 8, the latter has a larger anti-sidetracking effect. Therefore, in order to effectively use the action of twisting the belt 8, the angle α of inclination of the pivot axis C2 is preferably set within the range from 0 degrees exclusive to 45 degrees inclusive, more preferably from 0 degrees exclusive to 30 degrees inclusive.

However, when the angle α of inclination is small, the radial shaft load L geometrically acts largely in the direction of axis of the pin 64 (the direction of the pivot axis C2) so that the component force L1 producing a rotation moment becomes small and the component L0 of the radial shaft load acting on the direction of the pivot axis C2 becomes large. This leads to the increased sliding frictional resistance between the shaft member 62 and the support rod 63, thereby impeding smooth angular movement of the pulley body 60.

In addition, when the angle α of inclination is small and the drive belt 8 is thereby relatively largely twisted, the resistance of the belt 8 against its own twisting is likely to cause a problem. That is, this twisting resistance of the belt may also restrain the angular movement of the pulley body 60.

With these problems in mind, in this embodiment, a needle bearing 66 is interposed between the D-cut surface 63b of the support rod 63 and the facing surface 62a of the shaft member 62 in the idler pulley 6 as described above. The needle bearing 66 receives the component of the radial shaft load acting along the pivot axis C2 to minimize the sliding frictional resistance between the shaft member 62 and the support rod 63.

Furthermore, a feature of the present invention is that the arrangement of the idler pulley 6 in the engine accessory drive system A is well designed. Specifically, the system is appropriately set for the belt span lengths between the idler pulley 6 and the adjacent alternator pulley 3 and between the idler pulley 6 and the adjacent compressor pulley 4 to reduce the resistance of the drive belt 8 against its own twisting and thereby angularly move the idler pulley 6 with more reliability.

Hereinafter, a detailed description will be given to the setting of the belt span length based on actual test results.

Figure 8:
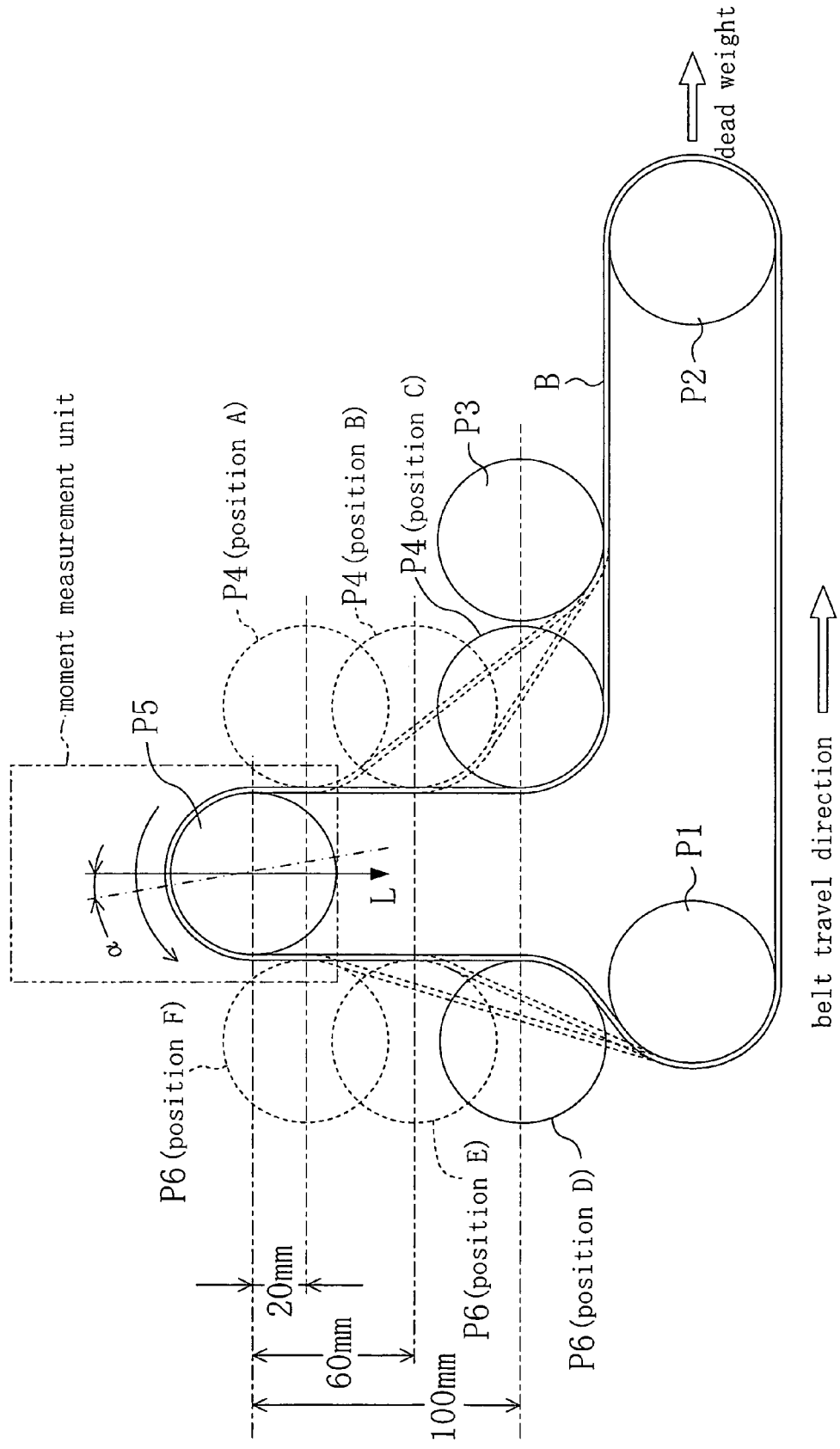
FIG. 8 is an illustration showing a layout of a belt run tester.

FIG. 8 shows a layout of a belt run tester. In this figure, P1 denotes a drive pulley that is driven to rotate by an unshown prime mover and P2 to P6 denotes driven pulleys. Out of these driven pulleys, P2 is a tension pulley for applying a predetermined tension to a flat belt B wrapped around the pulleys P1 to P6. The pulley P5 is an auto belt alignment pulley according to the present invention, and the pulleys P3, P4 and P6 are accessory pulleys.

Figure 18:
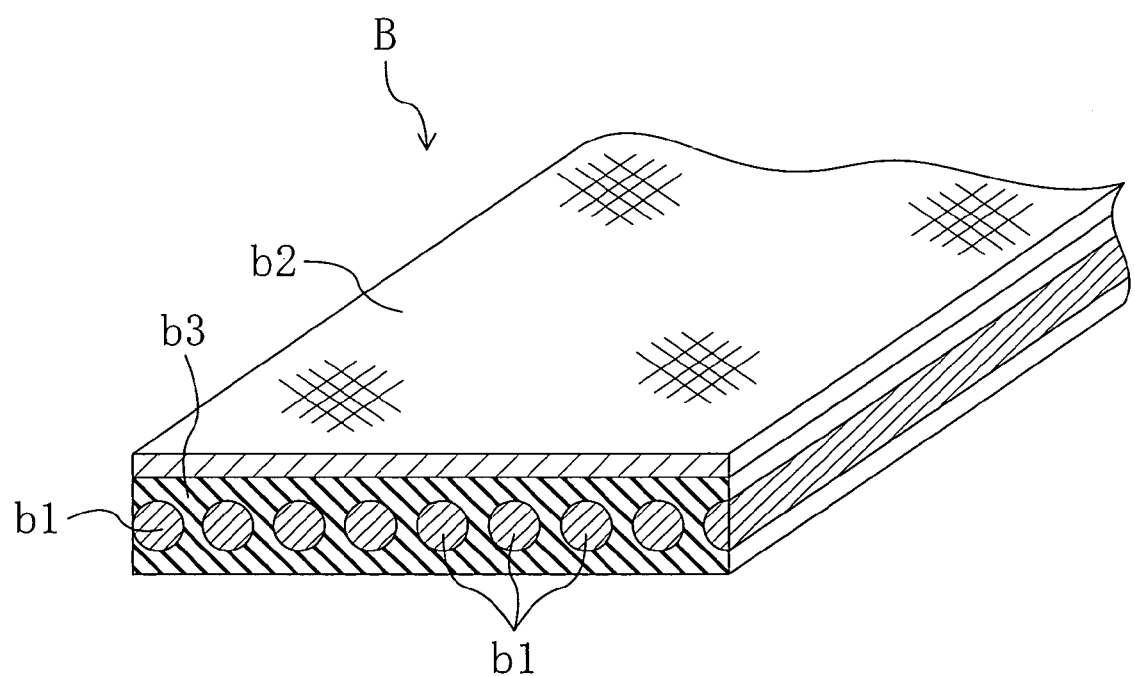
FIG. 18 is a partly cross-sectional perspective view showing the structure of a flat belt used in the run test.

The flat belt B, of which an exemplary structure is shown in FIG. 18, is a cord core flat belt using Z-twisted aramid cords b1, b1, . . . as a tension member. Three kinds of flat belts with different belt widths (10 mm, 20 mm and 26 mm) and the same thickness (2.8 mm) were prepared for test samples. The top fabric b2 of each flat belt B is a wooly nylon (NNW) fabric, and the compression rubber layer b3 thereof is made of ethylene-propylene-diene monomer (EPDM) rubber having a rubber hardness of 85 measured by a durometer Type A in conformity with JIS K6253. If test sample belts have a thickness ranging from 2.0 to 4.0 mm and their compression rubber layers b3 have a hardness ranging from 70 to 95, the same results can be obtained from the following experiment.

Each pulley P1 to P6 is a flat pulley with 60 mm diameter and 30 mm width. The drive pulley P1, tension pulley P2 and auto belt alignment pulley P5 are wrapped in a normal winding condition where the flat belt B contacts its inner face with the pulley outer peripheries, while the accessory pulleys P3, P4 and P6 are wrapped in an inverse winding condition where the flat belt B contacts its outer face with the pulley outer peripheries.

Out of the accessory pulleys P3, P4 and P6, two pulleys P4 and P6 adjacent to the auto belt alignment pulley P5 are changeable in its vertical position when viewed in FIG. 8, and each placed in any one of three different positions where belt span lengths from the auto belt alignment pulley P5 thereto are 20, 60 and 100 mm, respectively (i.e., Position A, B or C for P4 closer to the entrance to P5 and Position F, E or D for P6 closer to the exit from P5).

During the test, the drive pulley P1 is rotated at a substantially constant rotational speed of 500 rpm and, for example, at an ambient temperature of 24° C., so that the flat belt B is traveled sequentially from drive pulley P1 through tension pulley P2, accessory pulley P3, accessory pulley P4, auto belt alignment pulley P5 and accessory pulley P6 and then back to drive pulley P1, counterclockwise when viewed in FIG. 8.

Under these conditions, the belt span on the entrance side of the auto belt alignment pulley P5 (the belt span on the right side thereof in the figure) is first forcedly deviated to one side of the pulley width (in the direction orthogonal to the page in FIG. 8) to overlap the end of the belt B with the end of the pulley. At this time, measurement is made for the magnitude of rotation moment acting on the pulley P5 due to the deviation of the belt B and the associated angle of angular movement of the pulley P5. While this measurement is being made, the belt B is released from the forced deviation six seconds after the start of deviation. Then, until the deviation of the belt B is corrected by an angular movement of the pulley P5 to stabilize the running position of the belt B, observation is made on changes in the rotation moment and angle of angular movement of the pulley P5.

Figure 9:
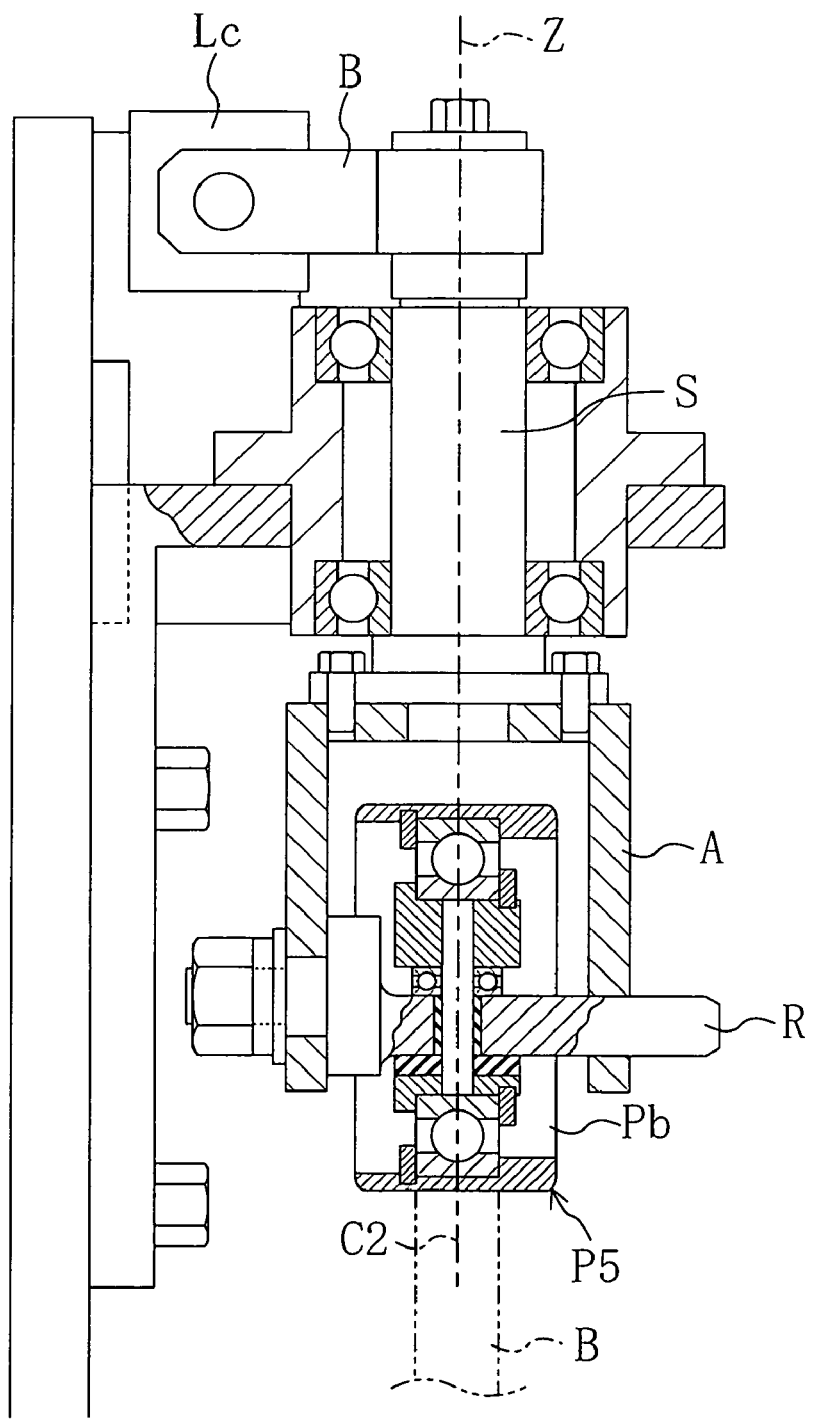
FIG. 9 is a side view of a moment measurement unit of the run tester.
Figure 10:
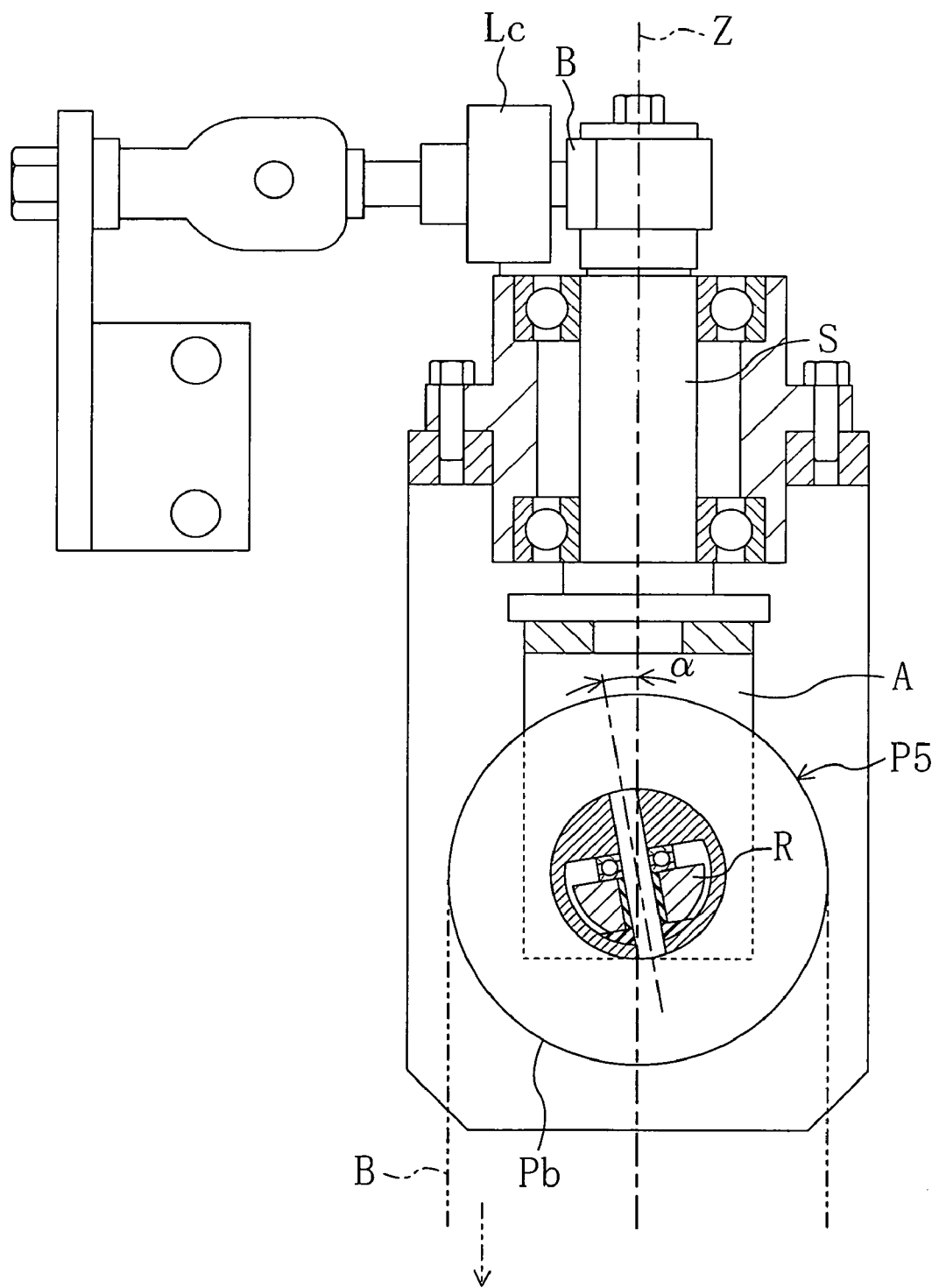
FIG. 10 is a front view of the moment measurement unit.

FIGS. 9 and 10 show the structure of a moment measurement unit for measuring the magnitude of rotation moment acting on the auto belt alignment pulley P5. In these figures, a support rod R for the auto belt alignment pulley P5 is securely attached at both ends to furcations, respectively, of a bifurcated arm A. This arm A is securely attached to the lower end of a shaft S for rotation about a vertical rotational axis Z. The upper end of the shaft S is fixed to a load cell Lc via a bracket B extending laterally. This load cell Lc is used to measure the rotation moment of the shaft S.

Specifically, the auto belt alignment pulley P5 is fixed between the furcations of the bifurcated arm A as described above and is positioned to intersect its pivot axis C2 with the rotational axis Z of the shaft S. Thus, the radial shaft load L of the flat belt B wrapped around the pulley P5 acts vertically downward. Furthermore, the pivot axis C2 of the auto belt alignment pulley P5 is inclined a predetermined angle $\alpha$ (approximately 10 degrees in the shown example) forward in the direction of rotation of the pulley body Pb with respect to the radial shaft load L as shown in FIG. 10. Therefore, when a deviation of the belt B causes a shift in the radial shaft load L, the shifted radial shaft load L and a reaction force from the support rod R produce a rotation moment about the pivot axis C2 on the pulley body Pb and also produce a rotation moment about the rotational axis of the shaft S on the support rod R.

Therefore, if the rotation moment of the shaft S is measured by the load cell Lc in the moment measurement unit, the rotation moment about the pivot axis C2 acting on the pulley body Pb can be determined based on the measured value. The thus determined rotation moment of the pulley body Pb reflects the change in magnitude of the radial shaft load L and the amount of shift thereof due to causes including pressure changes in contact surface between the pulley body Pb and the belt B. However, it does not reflect resistance of the belt B against its own twisting due to an angular movement of the pulley body Pb.

In the above moment measurement unit, only a single directional rotation moment can be measured with accuracy because of the structure of a measuring instrument that receives signals from the load cell Lc. In the above experiment, the moment measurement unit is designed to measure the rotation moment produced when the belt B has been first forcedly deviated. Therefore, the unit cannot accurately measure a reverse directional rotation moment produced when the belt has been then deviated to the other side. Furthermore, in the above experiment, the determination of the angle of angular movement of the pulley is implemented by measuring the location of the end of the pulley P5 by a laser displacement meter and calculating the angle of angular movement based on the measured value. The laser displacement meter, however, cannot identify the orientation of displacement because of its structural constraints. Therefore, in the following experiment results, the absolute values of angles of angular movement are given.

The experiment as described above was carried out by using three types of flat belts with different widths of 10, 20 and 26 mm while changing the position of each of the accessory pulleys P4 and P6 on the entrance and exit sides of the auto belt alignment pulley P5 among 20, 60 and 100 mm and changing the belt tension of each of them among 142N, 181N and 221N. The experiment results showed that the influences of tension changes were not so large within the above tension range. This is probably because the needle bearing minimized the sliding frictional resistance of the pulley body Pb against the support rod R.

Figure 11:
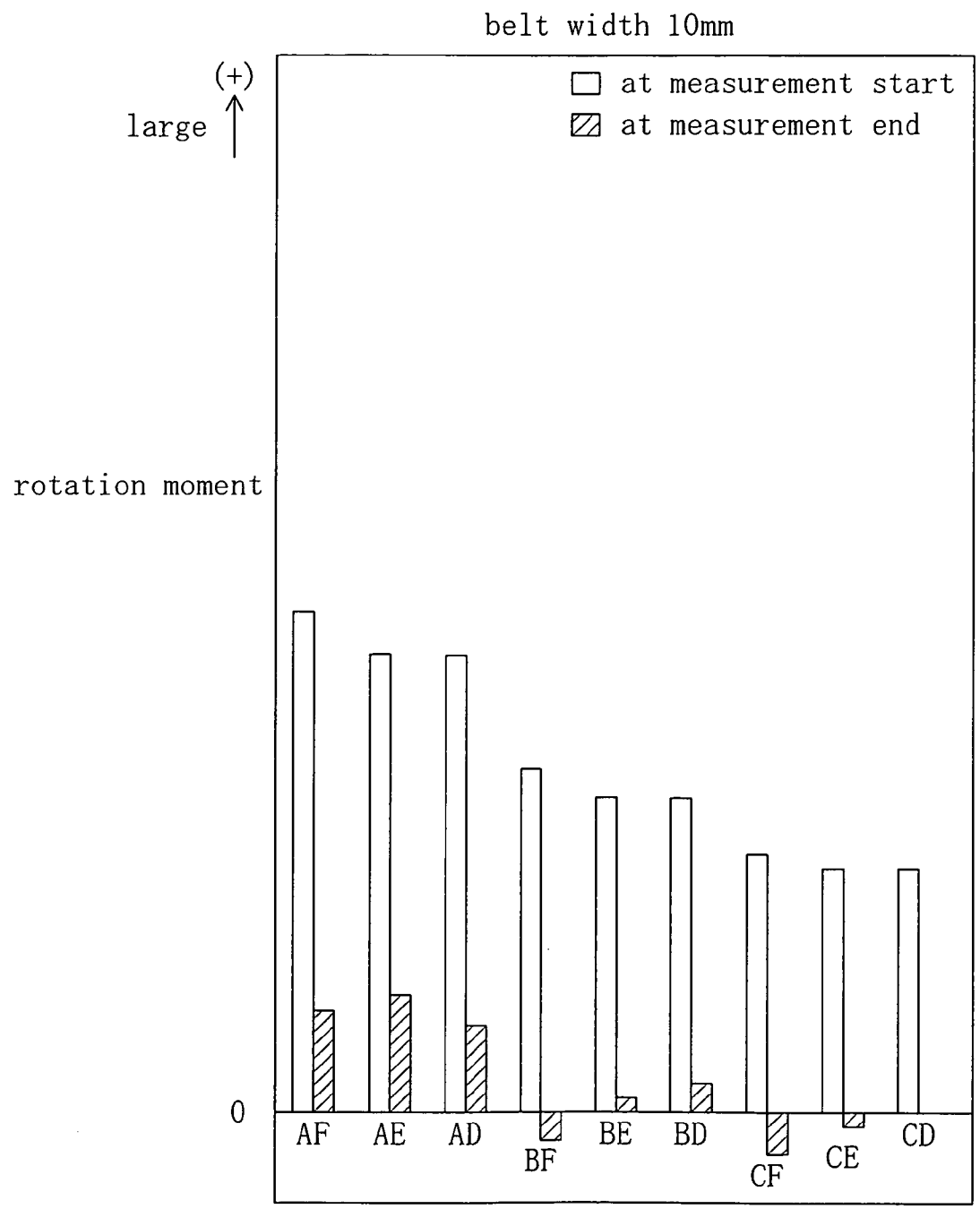
FIG. 11 is a graph showing the relationship between the span length of the belt and the rotation moment of the pulley based on experiment results when the belt width is 10 mm.
Figure 12:
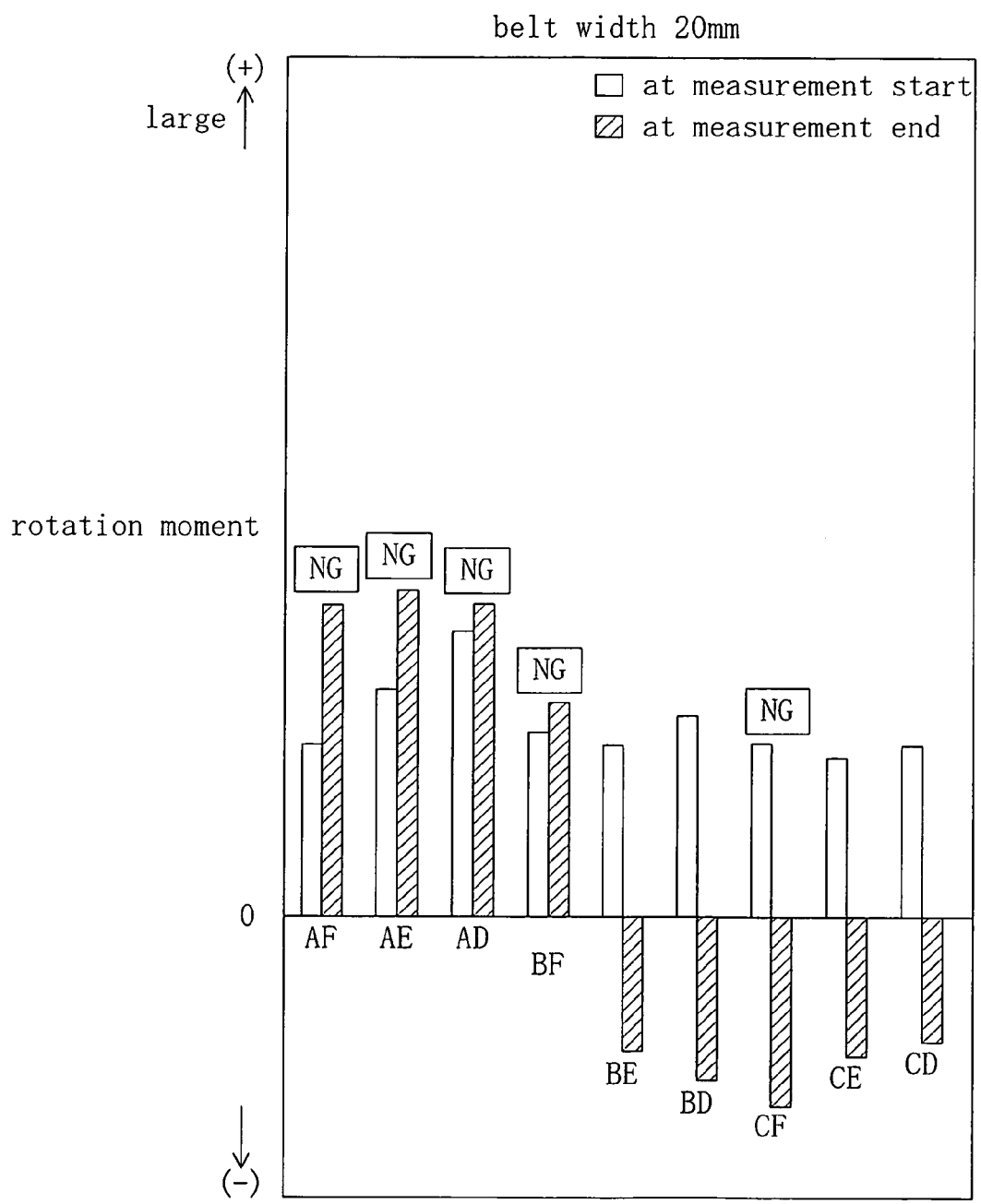
FIG. 12 is a corresponding graph to FIG. 11 when the belt width is 20 mm.
Figure 13:
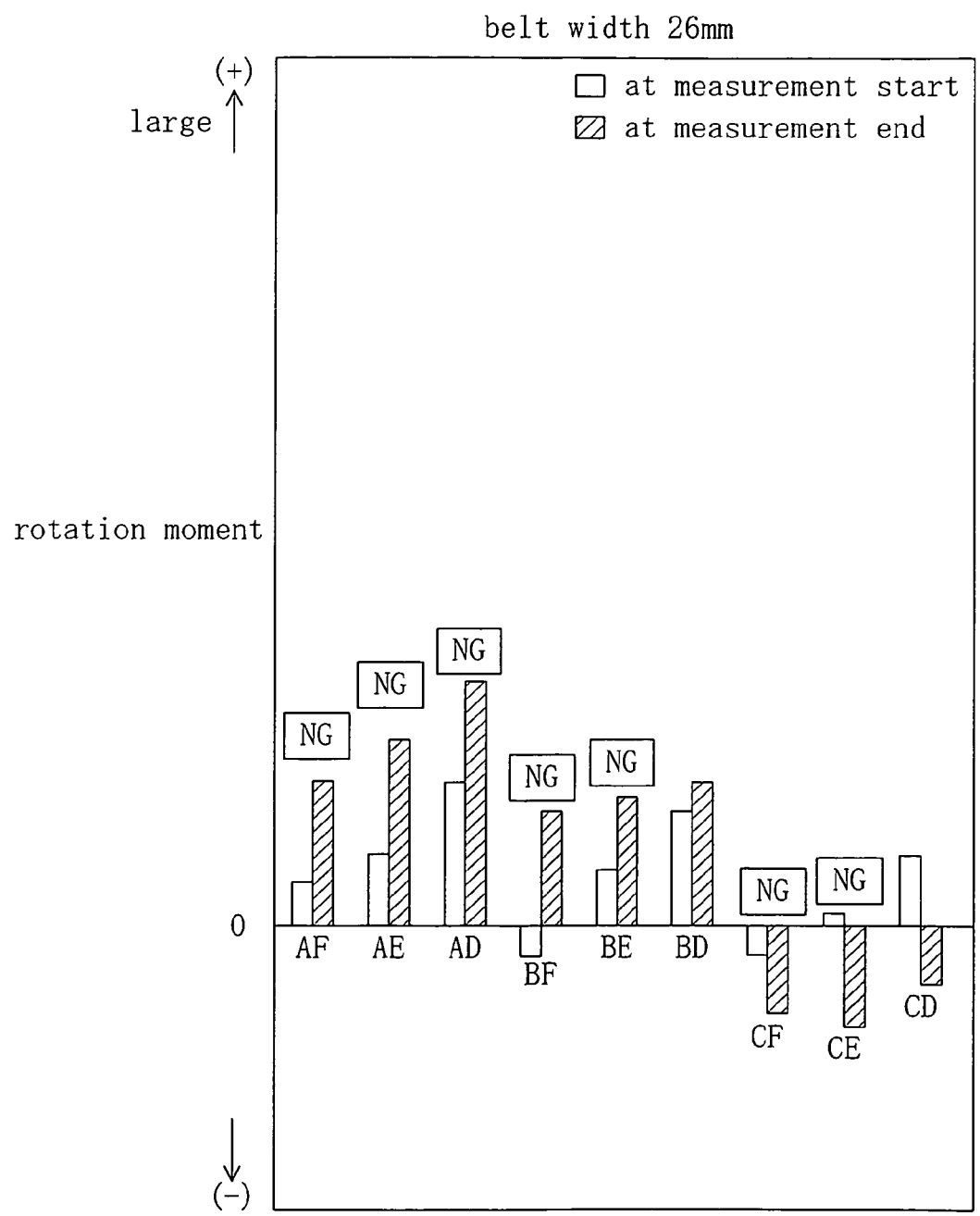
FIG. 13 is a corresponding graph to FIG. 11 when the belt width is 26 mm.
Figure 14:
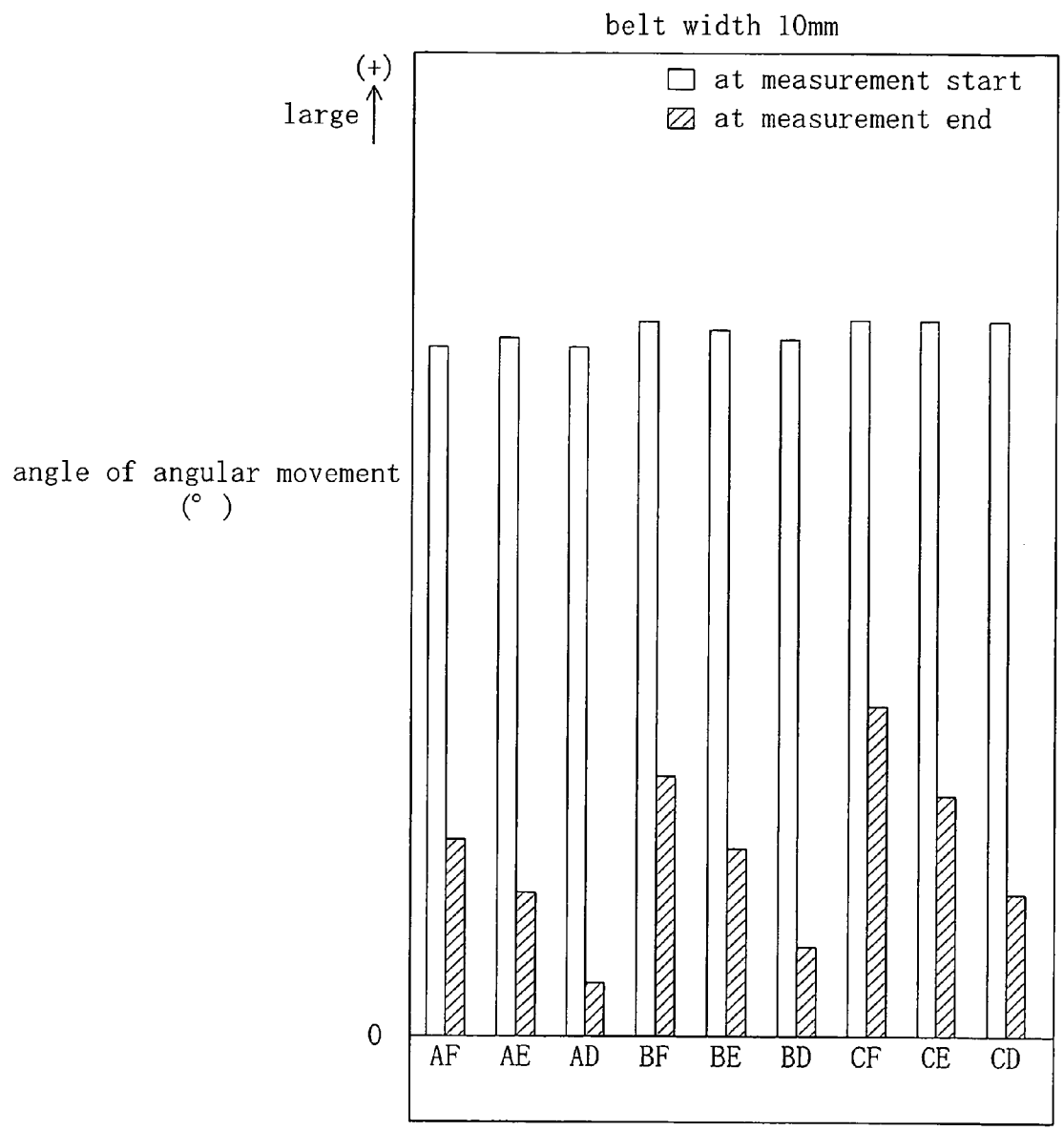
FIG. 14 is a graph showing the relationship between the span length of the belt and the angle of angular movement of the pulley based on the experiment results when the belt width is 10 mm.
Figure 15:
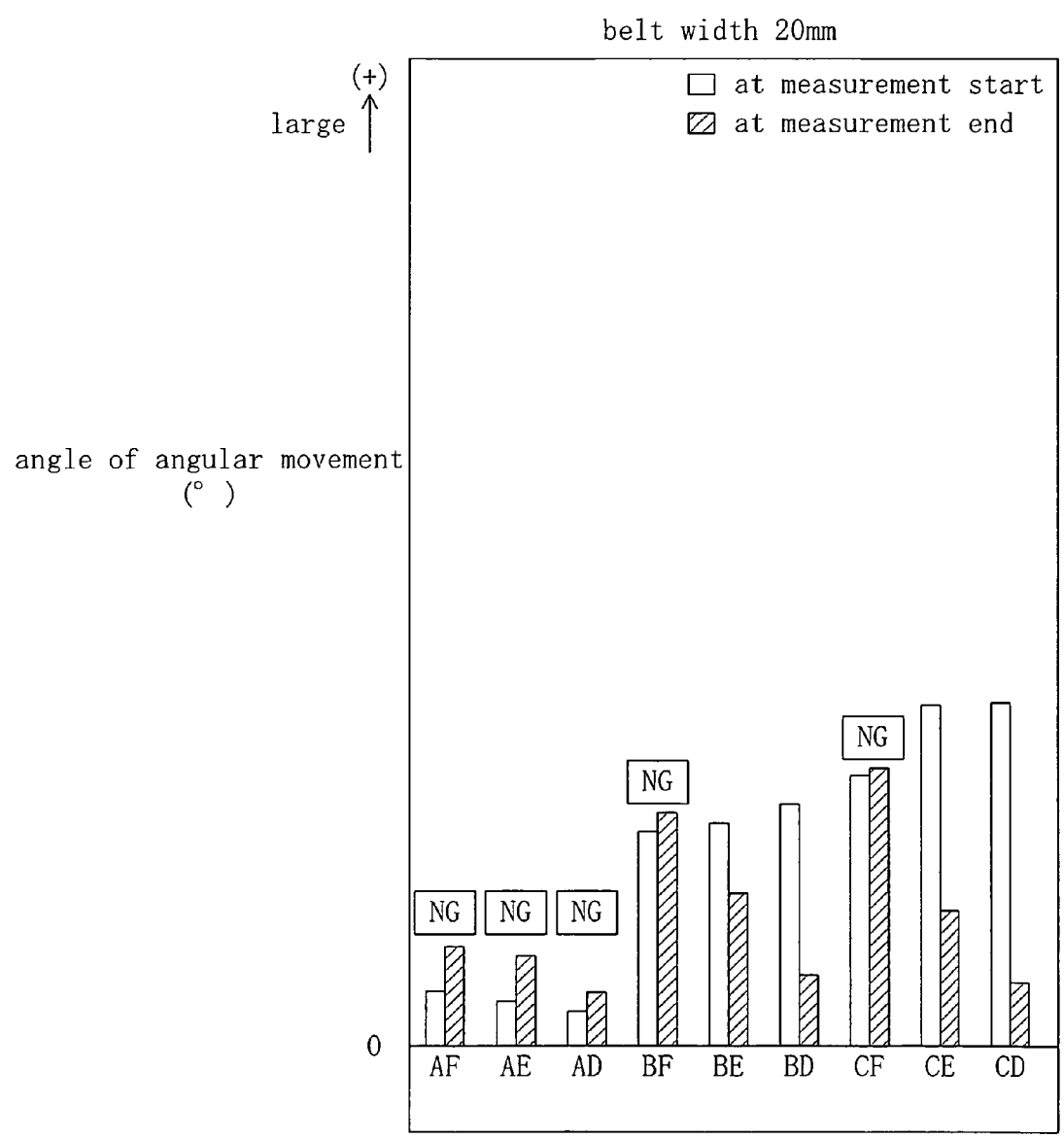
FIG. 15 is a corresponding graph to FIG. 14 when the belt width is 20 mm.
Figure 16:
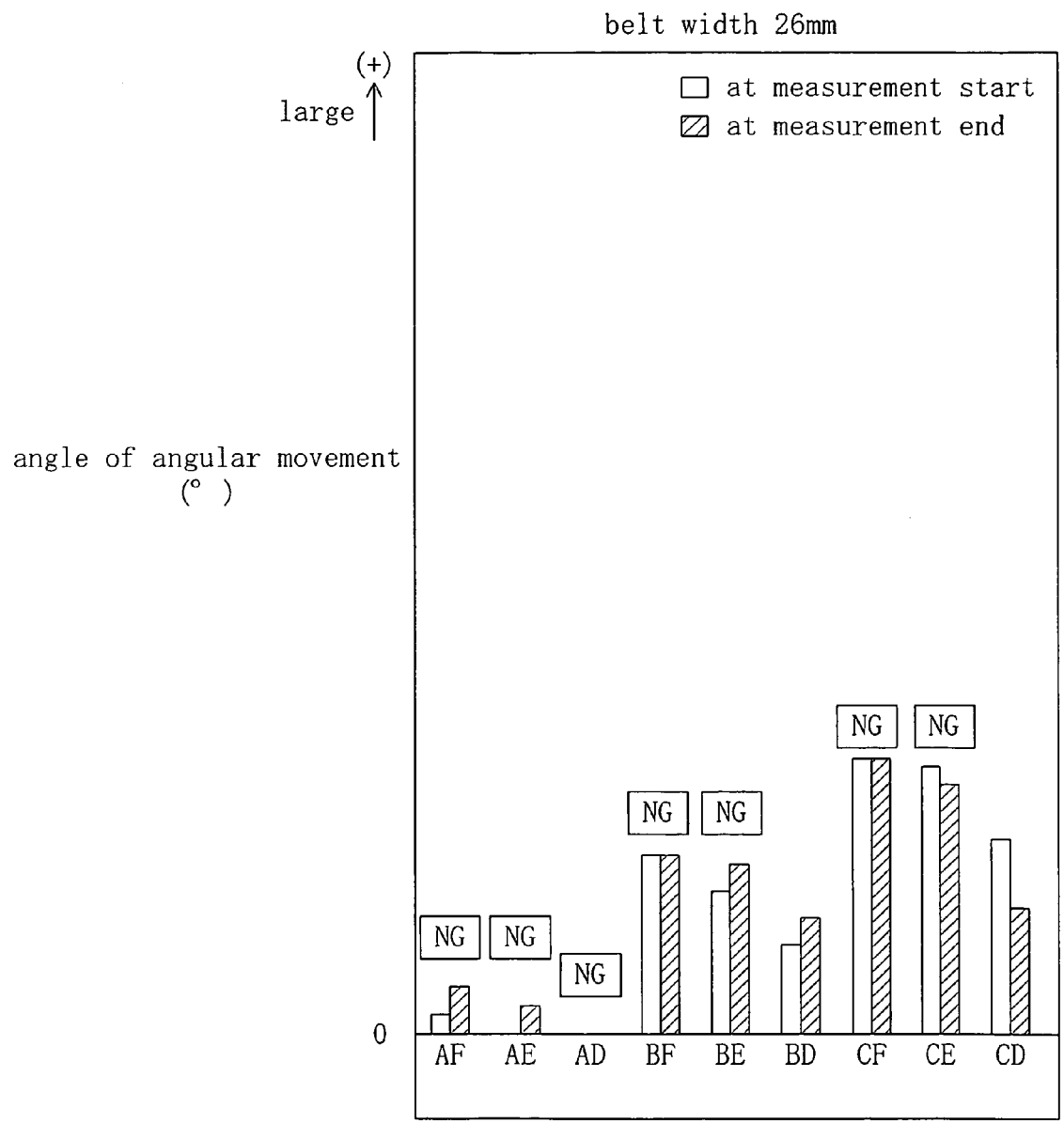
FIG. 16 is a corresponding graph to FIG. 14 when the belt width is 26 mm.

FIGS. 11 to 16 show experiment results in an exemplary case that the belts have a tension of 221N, wherein FIGS. 11 to 13 show the relationship between belt span length and pulley rotation moment when the belt widths are 10 mm, 20 mm and 26 mm, respectively, and FIGS. 14 to 16 show the relationship between belt span length and pulley angle of angular movement under the same conditions. In these figures, open bar graphs indicate starting time points of measurement and solid bar graphs indicate end time points thereof.

Observation is first made on the case with a belt width of 10 mm. At the starting time point of measurement, the belt B is forcedly deviated maximally so that a relatively large rotation moment is produced as shown in FIG. 11. Therefore, as shown in FIG. 14, the pulley P5 largely angularly moves regardless of span length. In this case, it can be seen form FIG. 11 that when the belt span on the entrance side of the pulley P5 is 20 mm (AF, AE and AD), larger rotation moments are produced than when it is 60 mm or 100 mm. This is probably because when the belt B is twisted by an angular movement of the auto belt alignment pulley P5, the surface pressure distribution in the contact surface between the belt B and the pulley P5 changes to change the magnitude of the radial shaft load L acting on the pulley P5.

Figure 17A:
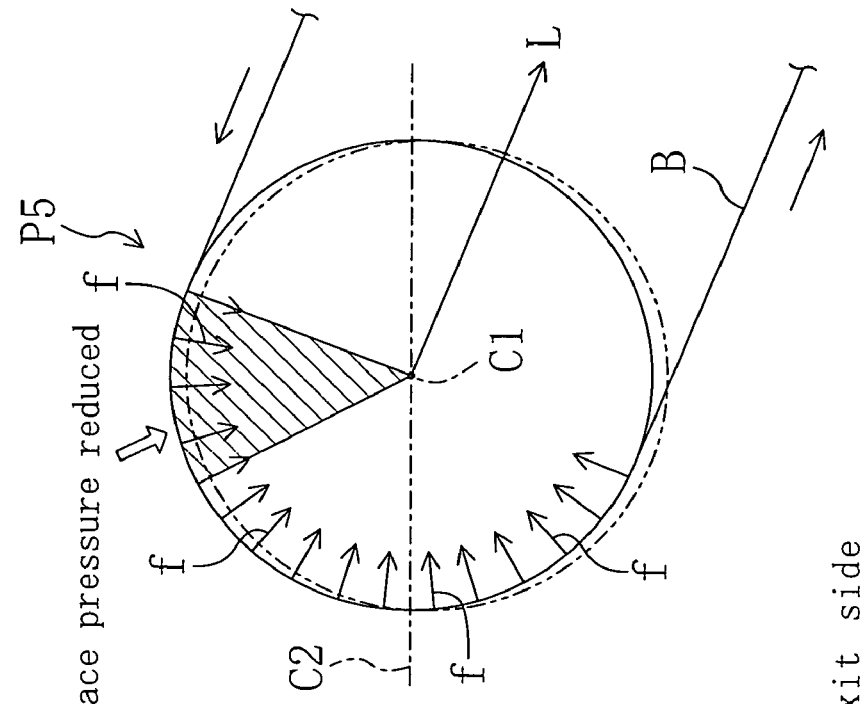
FIG. 17A is an illustration showing that the surface pressure at the contact surface of the pulley with the belt changes depending upon the angular position of the pulley and FIG. 17B shows the distribution of surface pressures.

Namely, if the pulley body Pb of the auto belt alignment pulley P5 angularly moves to assume an oblique position to the belt B, this means that, as schematically shown in the imaginary lines in FIG. 17, its side to which the belt B has deviated moves forward in the belt travel direction (downward in the figure). Thereby, the side of the pulley body Pb to which the belt B has deviated gets away from the span of the belt B on the entrance side of the pulley P5 to reduce the surface pressures between the pulley body Pb and the belt B and in turn reduce the rotation moment of the pulley body Pb.

Figure 17B:
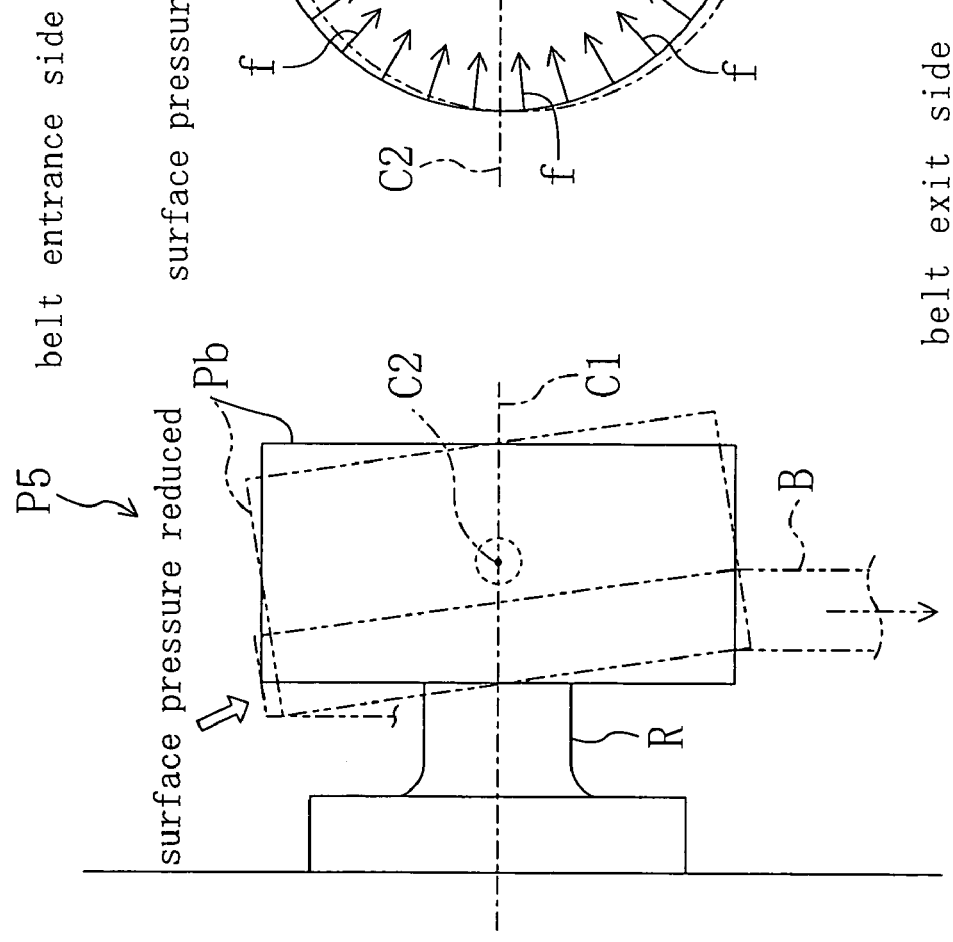

More specifically, as shown in FIG. 17B, contact surface pressures (vectors) f, f, . . . due to tension from the belt B act on the pulley body Pb of the auto belt alignment pulley P5 and the resultant of these contact surface pressures provides a radial shaft load L. The pressures f, f, . . . in the direction orthogonal to the radial shaft load L are cancelled each other and balanced. Out of the contact surface pressures f, f, . . . in the direction orthogonal to the pivot axis C2, those located on the entrance side of the pulley P5 within an angle range corresponding to twice as large as the angle α of inclination (shown in hatched lines in the figure) remain uncanceled and cause the pulley body Pb to produce a rotation moment.

Therefore, if the pulley body Pb angularly moves about the pivot axis C2 to geometrically get away from the span of the belt B on the entrance side of the pulley P5 and reduce the contact surface pressures f, f, . . . between them, this means that the contact surface pressures f, f, . . . are reduced within an angle range in which a rotation moment is caused on the pulley body Pb. For this reason, the rotation moment of the pulley body Pb decreases.

In respect of such a decrease in rotation moment, when the belt span on the entrance side of the pulley P5 is short like AF, AE and AD, the rotation moment of the pulley body Pb becomes larger than when the belt span is long (BF, BE, BD, CF, CE and CD): This is probably because the belt B is pressed against the auto belt alignment pulley P5 by the accessory pulley P4 adjacent to the entrance side of the auto belt alignment pulley P5 so that the decrease in surface pressure on the entrance side thereof is restrained.

Therefore, when the belt span on the entrance side of the auto belt alignment pulley P5 is set at a small length to a certain extent, the radial shaft load can be well imposed on the pulley even when the pulley body Pb angularly moves, thereby reducing the decrease in rotation moment caused by the angular movement of the pulley body Pb. This is advantageous in angularly moving the pulley body Pb. In addition, to that end, the length of the belt span on the entrance side of the pulley P5 is preferably set at less than about three times as large as the belt width. The reason for this is, as shown later in FIG. 12, that with a belt width of 20 mm, the magnitude of rotation moment does not vary between a case where the length of the belt span on the entrance side of the pulley P5 is 60 mm (BE and BD) and a case where the length of the belt span on the same side is 100 mm (CE and CD).

Though not shown in the above experiment results, a decrease in belt span, regardless whether on the entrance side or exit side of the auto belt alignment pulley, causes a corresponding increase in the resistance of the belt B against its own twisting. Therefore, the span length cannot so much be decreased. In the above experiment, since the belt width is as relatively narrow as 10 mm while the belt span length is long enough, it can be considered that the twisting resistance of the belt does not matter.

With reference to the relationships at the end time points of measurement in FIGS. 11 and 14, every angle of angular movement and rotation moment are largely reduced as compared with those at the starting time points of measurement. Also from this, it can be seen that the deviation of each belt B has been corrected. However, the rotation moments and angles of angular movement are not zero even at the end time points of measurement, which means that the belt B does not necessarily travel the course of the middle of width of the pulley P5. This is because the entire belt drive system causes a deviation of the belt B because of deviations of the pulleys P1 to P6 from their normal positions in the run tester and a habit of deviation of the belt B itself due to, for example, the cord twisting manner (Z-twist in this example). The deviation of the belt B and the deviation correcting action of the auto belt alignment pulley P5 are just canceled with each other so that the belt B can travel stably.

At the end time points of measurement, the belt B is not forcedly deviated unlike the starting time points of measurement but stably travels as described above. Therefore, as shown in FIG. 14, the angle of angular movement of the pulley B differs depending upon the belt span length. Specifically, as the belt span on the entrance side of the pulley P5 is increased in the order of A, B and C, the twisting resistance of the belt B becomes smaller and the angle of angular movement of the pulley P5 becomes larger.

Though the belt span on the exit side of the pulley P5 is increased in the order of F, E and D, the angle of angular movement of the pulley P5 becomes smaller in this order. This is probably for a simple reason: the belt B is changed in its travel direction by the application of twisting from the pulley P5 to increase the distance to reach the next pulley P6 and correspondingly decrease the angle of angular movement.

As described so far, when the belt width is relatively small (10 mm), a good anti-sidetracking effect can be obtained whether the belt span length is 20, 60 or 100 mm. On the other hand, when the belt width is larger (20 mm) as shown in FIGS. 12 and 15, the anti-sidetracking effect largely varies depending upon the belt span length. Specifically, for AF, AE, AD, BF and CF, i.e., when either one of the belt span lengths on the entrance and exit sides of the pulley P5 is equal to the belt width, the release of forced deviation causes the belt B to run off the pulley P5. As a result, a necessary anti-sidetracking effect cannot be obtained as indicated as "NG" in FIGS. 12 and 15.

More specifically, in "NG" cases shown in these figures, the rotation moments and the angles of angular movement at the end time points of measurement are larger than those at the starting time points of measurement. It can be seen from this that the deviation of the belt B becomes larger after the release of the forced deviation. Furthermore, since in "NG" cases the angles of angular movement of the pulley P5 as shown in FIG. 15 are very small relative to the rotation moments as shown in FIG. 12, this shows that the resistance of the belt B against its own twisting due to angular movement of the pulley P5 is large. Therefore, it can be considered that this twisting resistance of the belt B restrains the angular movement of the pulley P5 to prevent the correction of deviation of the belt B.

On the other hand, FIGS. 12 and 15 also show that when both the belt span lengths on the entrance and exit sides of the pulley P5 are larger than the belt width (i.e., for BE, BD, CE and CD), the auto belt alignment pulley P5 exhibits its anti-sidetracking effect. In these cases, the rotation moments and the angles of angular movement at the end time points of measurement become smaller than those at the starting time points of measurement. As shown in FIG. 12, all the rotation moments at the end time points of measurement have a negative sign. This shows that the belt B deviated beyond the middle of the width of the pulley to the other side different from the side on which it initially deviated, though the measured values themselves are not necessarily correct because of the characteristics of the moment measurement unit as described above.

When the belt width is further increased (26 mm) as shown in FIGS. 13 and 16, the tendency in the case of a belt width of 20 mm is emphasized, wherein no anti-sidetracking effect can be obtained ("NG") in the cases of AF, AE, AD, BF and CF and also "NG" in the cases of BE and CE. The reason that no anti-sidetracking effect is obtained even when the belt span length is larger than the belt width is conceivable as follows. When the belt width is too large relative to the pulley width, not only the twisting resistance of the belt becomes larger, but also the amount of belt deviation, i.e., the amount of shift in the position of the radial shaft load center is too small even if the belt is deviated to the full width of the pulley. As a result, a sufficient rotation moment is not produced.

As can be seen from the above experiment results, when an idler pulley 60 having the above-mentioned auto belt alignment function is used in the engine accessory drive system (belt drive system) A according to this embodiment, the belt span length between the idler pulley 6 and each of the adjacent alternator pulley 3 and compressor pulley 4 on the entrance and exit sides of the idler pulley 6 needs to be set larger than the width of the flat belt 8.

Thus, the idler pulley 6 can be well angularly moved against the twisting resistance of the belt B to obtain the above-mentioned anti-sidetracking effect on the belt 8, though the relationship between the belt width and pulley width, the angle of wrap of the belt B on the pulley body Pb, or the thickness, material and shape of the belt B need to be set appropriately because they correlatively affect the anti-sidetracking effect.

For example, it might be considered that as the pulley width is increased relative to the belt width, the rotation moment due to deviation of the belt B theoretically is also increased infinitely. However, such a great deviation cannot actually occur. Therefore, within a general range of pulley widths (for example, not more than twice as large as belt width), the above requirements are necessary.

Furthermore, in the engine accessory drive system A of this embodiment, the length of the belt span Si on the entrance side of the idler pulley 6 is set at about 2.5 times as large as the belt width and is shorter than the belt span So on the exit side of the idler pulley 6. This effectively restrains changes in contact surface pressure caused when the belt 8 is twisted by angular movement of the idler pulley 6 to reduce decrease in rotation moment due to changes in contact surface pressure, thereby further enhancing the above effect.

In the above embodiment, the auto belt alignment pulley is used as the idler pulley 6. However, the auto belt alignment pulley of the present invention is not limited to idler pulleys but can also be used as any pulley other than drive pulleys. For example, the auto belt alignment pulley can be used for various purposes in the belt drive system, such as adjustment of belt length and angle of wrap and change in the belt travel direction.

In addition to flat belts, various synchronous belts can also be used as a drive belt 8. In such cases, the back face opposite to the working face is made contact with the auto belt alignment pulley P5.

In the idler pulley 6 of the above embodiment, the component of the radial shaft load in the direction of pivot axis C2 is taken up by the needle bearing 66 interposed between the D-cut surface 63b of the support rod 63 and the facing surface 62a of the shaft member 62. However, how to take up the component of the radial shaft load in the direction of pivot axis C2 is not limited to the above. For example, a resin-made sliding member may be interposed between the D-cut surface 63b and the facing surface 62a, or both the surfaces 63b and 62a may be made direct sliding contact.

Furthermore, in the idler pulley 6 of the above embodiment, the pivot axis C2 is composed of the pin 64. The pivot axis C2, however, is not limited to pins. For example, the pivot axis C2 may be composed of a hemispherical projection formed on the D-cut surface 63b of the support rod 63, or may be implemented by fitting a ball into a recess in the D-cut surface 63b. In these cases, a recess for fitting the hemispherical projection or ball is formed in the facing surface 62a of the shaft member 62.

Moreover, in the idler pulley 6 of the above embodiment, the pivot axis C2 serving as the center of angular movement of the pulley body 60 and the shaft member 62 is orthogonal to the rotational axis C1 of the pulley body 60. However, the pivot axis C2 need not necessarily be orthogonal to the rotational axis C1, but need only be inclined at a predetermined angle α to the direction of the radial shaft load L when viewed along the rotational axis C1 of the pulley body 60.

INDUSTRIAL APPLICABILITY

Since, as can be seen from the above, the belt drive system according to the present invention can certainly prevent wobbling and sidetracking of the belt, it can make effective use of flat belts with very high power transmission efficiency for various kinds of industrial machines and other equipment and therefore has industrial applicability.

What is claimed is:

1. A belt drive system in which a drive belt is wrapped around a plurality of pulleys, wherein at least one of the plurality of pulleys is an auto belt alignment pulley comprising:
    a hollow cylindrical pulley body around which the drive belt is wrapped; and
    a support mechanism that supports the pulley body to allow the pulley body to rotate about its rotational axis and angularly move about a set pivot axis inclined at a predetermined angle forward in the direction of rotation of the pulley body with respect to the direction of a radial shaft load when viewed along the rotational axis,
    wherein the belt drive system is configured such that when the belt deviates to one side of the pulley body, the one side of the pulley body moves toward the direction of the radial shaft load and the pulley body moves angularly about the set pivot axis, and concurrently the one side of the pulley body moves forward in the travel direction of the drive belt toward the other side of the pulley body so that the pulley body contacts obliquely with the drive belt, and
    the length of a belt span between the auto belt alignment pulley and each of adjacent pulleys is set larger than the width of the drive belt.

2. The belt drive system of claim 1, wherein the said length of the belt span is set larger than the width of the drive belt.

3. The belt drive system of claim 1, wherein the length of a belt span on an entrance side of the auto belt alignment pulley from which the drive belt enters the auto belt alignment pulley is set smaller than that of a belt span on an exit side of the auto belt alignment pulley toward which the drive belt exits.

4. The belt drive system of claim 3, wherein the length of the belt span on the entrance side of the auto belt alignment pulley is set at less than about three times as large as the width of the drive belt.

5. The belt drive system of claim 1, wherein the angle of inclination of the pivot axis in the auto belt alignment pulley is set within the range from 0 degrees exclusive to 45 degrees inclusive.

6. The belt drive system of claim 1, wherein the support mechanism for the auto belt alignment pulley comprises:
    a hollow cylindrical shaft member that rotatably carries the pulley body;
    a support rod that is inserted in the hollow portion of the shaft member; and
    an engagement member that is located between and engages with both the support rod and the shaft member to constitute the pivot axis.

* * * * *

UNITED STATES PATENT AND TRADEMARK OFFICE
CERTIFICATE OF CORRECTION

| | | |
|---|---|---|
| PATENT NO. | : 7,563,187 B2 | Page 1 of 1 |
| APPLICATION NO. | : 11/058600 | |
| DATED | : July 21, 2009 | |
| INVENTOR(S) | : Hirofumi Miyata | |

It is certified that error appears in the above-identified patent and that said Letters Patent is hereby corrected as shown below:

Title Page, Item [75] Inventor should read:
    Hirofumi Miyata, Hyogo (JP)

On the Title Page:

The first or sole Notice should read --

Subject to any disclaimer, the term of this patent is extended or adjusted under 35 U.S.C. 154(b) by 470 days.

This patent is subject to a terminal disclaimer.

Signed and Sealed this
Eleventh Day of January, 2011

David J. Kappos
*Director of the United States Patent and Trademark Office*